US010210452B2

(12) United States Patent
Szatmary et al.

(10) Patent No.: US 10,210,452 B2
(45) Date of Patent: Feb. 19, 2019

(54) HIGH LEVEL NEUROMORPHIC NETWORK DESCRIPTION APPARATUS AND METHODS

(75) Inventors: Botond Szatmary, San Diego, CA (US); Eugene M. Izhikevich, San Diego, CA (US); Csaba Petre, San Diego, CA (US); Jayram Moorkanikara Nageswaran, San Diego, CA (US); Filip Piekniewski, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 275 days.

(21) Appl. No.: 13/385,933

(22) Filed: Mar. 15, 2012

(65) Prior Publication Data

US 2013/0073500 A1 Mar. 21, 2013

Related U.S. Application Data

(63) Continuation-in-part of application No. 13/239,123, filed on Sep. 21, 2011, now Pat. No. 9,104,973.

(51) Int. Cl.
*G06N 3/10* (2006.01)
*G06N 3/04* (2006.01)

(52) U.S. Cl.
CPC .............. *G06N 3/105* (2013.01); *G06N 3/04* (2013.01)

(58) Field of Classification Search
CPC ............. G06N 3/02; G06N 3/04; G06N 3/105
See application file for complete search history.

(56) References Cited

U.S. PATENT DOCUMENTS 5,063,603 A 11/1991 Burt
5,355,435 A 10/1994 Deyong
(Continued)

FOREIGN PATENT DOCUMENTS

CN 1094831 A 11/1994
CN 1482573 A 3/2004
(Continued)

OTHER PUBLICATIONS

Goodman, D. et al. "Brian: a simulator for spiking neural networks in Python". Frontiers in Neuroinformatics vol. 2 Nov. 2008 pp. 1-10 [retrieved /16/2014]. [retrieved from ncbi.nlm.nih.gov].*
(Continued)

*Primary Examiner* — Eric Nilsson
(74) *Attorney, Agent, or Firm* — Seyfarth Shaw LLP

(57) ABSTRACT

Apparatus and methods for high-level neuromorphic network description (HLND) framework that may be configured to enable users to define neuromorphic network architectures using a unified and unambiguous representation that is both human-readable and machine-interpretable. The framework may be used to define nodes types, node-to-node connection types, instantiate node instances for different node types, and to generate instances of connection types between these nodes. To facilitate framework usage, the HLND format may provide the flexibility required by computational neuroscientists and, at the same time, provides a user-friendly interface for users with limited experience in modeling neurons. The HLND kernel may comprise an interface to Elementary Network Description (END) that is optimized for efficient representation of neuronal systems in hardware-independent manner and enables seamless translation of HLND model description into hardware instructions for execution by various processing modules.

39 Claims, 17 Drawing Sheets

(56) References Cited

U.S. PATENT DOCUMENTS

| | | | |
|---|---|---|---|
| 5,638,359 A | 6/1997 | Peltola | |
| 5,673,367 A | 9/1997 | Buckley | |
| 5,875,108 A | 2/1999 | Hoffberg | |
| 5,980,096 A * | 11/1999 | Thalhammer-Reyero | |
| 6,009,418 A | 12/1999 | Cooper | |
| 6,014,653 A | 1/2000 | Thaler | |
| 6,226,780 B1 * | 5/2001 | Bahra | G06F 17/5045 |
| | | | 716/102 |
| 6,458,157 B1 | 10/2002 | Suaning | |
| 6,545,705 B1 | 4/2003 | Sigel | |
| 6,545,708 B1 | 4/2003 | Tamayama | |
| 6,546,291 B2 | 4/2003 | Merfeld | |
| 6,581,046 B1 | 6/2003 | Ahissar | |
| 7,010,470 B2 * | 3/2006 | Kodosky | G06F 8/34 |
| | | | 702/57 |
| 7,536,374 B2 * | 5/2009 | Au | 706/55 |
| 7,849,030 B2 | 12/2010 | Ellingsworth | |
| 8,015,130 B2 | 9/2011 | Matsugu | |
| 8,103,602 B2 | 1/2012 | Izhikevich | |
| 8,315,305 B2 | 11/2012 | Petre | |
| 8,467,623 B2 | 6/2013 | Izhikevich | |
| 2002/0038294 A1 | 3/2002 | Matsugu | |
| 2003/0040020 A1 | 2/2003 | Nguyen et al. | |
| 2003/0050903 A1 | 11/2003 | Liaw | |
| 2004/0193670 A1 | 9/2004 | Langan | |
| 2005/0015351 A1 | 1/2005 | Nugent | |
| 2005/0036649 A1 | 2/2005 | Yokono | |
| 2005/0283450 A1 | 12/2005 | Matsugu | |
| 2006/0161218 A1 | 7/2006 | Danilov | |
| 2006/0224533 A1 * | 10/2006 | Thaler | 706/15 |
| 2007/0176643 A1 | 8/2007 | Nugent | |
| 2007/0192262 A1 | 8/2007 | Marianetti, II et al. | |
| 2007/0208678 A1 | 9/2007 | Matsugu | |
| 2009/0287624 A1 | 11/2009 | Rouat | |
| 2009/0043722 A1 | 12/2009 | Nugent | |
| 2010/0086171 A1 | 4/2010 | Lapstun | |
| 2010/0119214 A1 | 5/2010 | Breitwisch | |
| 2010/0166320 A1 | 7/2010 | Paquier | |
| 2011/0016071 A1 | 1/2011 | Guillen | |
| 2011/0106741 A1 | 5/2011 | Denneau | |
| 2011/0119214 A1 | 5/2011 | Breitwisch | |
| 2011/0119215 A1 | 5/2011 | Elmegreen | |
| 2011/0160741 A1 | 6/2011 | Asano | |
| 2012/0011090 A1 | 1/2012 | Tang | |
| 2012/0109866 A1 | 5/2012 | Modha | |
| 2012/0303091 A1 | 11/2012 | Izhikevich | |
| 2012/0308076 A1 | 12/2012 | Piekniewski | |
| 2012/0308136 A1 | 12/2012 | Izhikevich | |
| 2013/0073484 A1 | 3/2013 | Izhikevich | |
| 2013/0073491 A1 | 3/2013 | Izhikevich | |
| 2013/0073492 A1 | 3/2013 | Izhikevich | |
| 2013/0073495 A1 | 3/2013 | Izhikevich | |
| 2013/0073496 A1 | 3/2013 | Szatmary | |
| 2013/0073498 A1 | 3/2013 | Izhikevich | |
| 2013/0073499 A1 | 3/2013 | Izhikevich | |
| 2013/0073500 A1 | 3/2013 | Szatmary | |
| 2013/0151448 A1 | 6/2013 | Ponulak | |
| 2013/0151450 A1 | 6/2013 | Ponulak | |
| 2013/0218821 A1 | 8/2013 | Szatmary | |
| 2013/0251278 A1 | 9/2013 | Izhikevich | |
| 2013/0297539 A1 | 11/2013 | Piekniewski | |
| 2013/0297541 A1 | 11/2013 | Piekniewski | |
| 2013/0297542 A1 | 11/2013 | Piekniewski | |
| 2013/0325768 A1 | 12/2013 | Sinyavskiy | |
| 2013/0325773 A1 | 12/2013 | Sinyavskiy | |
| 2013/0325774 A1 | 12/2013 | Sinyavskiy | |
| 2013/0325775 A1 | 12/2013 | Sinyavskiy | |
| 2013/0325776 A1 | 12/2013 | Ponulak et al. | |
| 2013/0325777 A1 | 12/2013 | Petre | |
| 2014/0012788 A1 | 1/2014 | Piekniewski | |
| 2014/0032458 A1 | 1/2014 | Sinyavskiy | |
| 2014/0032459 A1 | 1/2014 | Sinyavskiy | |
| 2014/0052679 A1 | 2/2014 | Sinyavskiy et al. | |
| 2014/0064609 A1 | 3/2014 | Petre et al. | |
| 2014/0081895 A1 | 3/2014 | Coenen et al. | |
| 2014/0122397 A1 | 5/2014 | Richert et al. | |
| 2014/0122398 A1 | 5/2014 | Richert | |
| 2014/0122399 A1 | 5/2014 | Szatmary et al. | |
| 2014/0156574 A1 | 6/2014 | Piekniewski et al. | |
| 2014/0219497 A1 | 8/2014 | Richert | |
| 2014/0222739 A1 | 8/2014 | Ponulak | |
| 2014/0229411 A1 | 8/2014 | Richert et al. | |
| 2014/0244557 A1 | 8/2014 | Piekniewski et al. | |
| 2014/0250036 A1 | 9/2014 | Izhikevich | |
| 2014/0250037 A1 | 9/2014 | Izhikevich | |
| 2014/0372355 A1 | 12/2014 | Izhikevich et al. | |

FOREIGN PATENT DOCUMENTS

| | | |
|---|---|---|
| CN | 101977112 A | 2/2011 |
| CN | 102226740 | 10/2011 |
| JP | 4087423 | 3/1992 |
| RU | 2108612 | 10/1998 |
| RU | 2406105 | 10/2010 |
| RU | 2424561 | 7/2011 |
| TW | 301728 B | 4/1997 |
| TW | 201110040 A | 3/2011 |
| WO | 2008132066 | 6/2008 |
| WO | 2008083335 | 7/2008 |

OTHER PUBLICATIONS

Graham, L. "The Surf Hippo User Manual Version 3.0 B". Unite de Neurosciences Integratives et Computationnelles Institut Federatif de Neurobiologie Alfred Fessard, CNRS. France. Mar. 2002 [retrieved Jan. 16, 2014]. [retrieved biomedicale.univ-paris5.fr].*

Goodman, D. et al. "Brian: a simulator for spiking neural networks in Python". Frontiers in Neuroinformatics vol. 2 Nov. 2008 pp. 1-10 [retrieved Jan. 16, 2014]. [retrieved from ncbi.nlm.nih.gov].*

Gleeson, P., et al. "NeuroML: a language for describing data driven models of neurons and networks with a high degree of biological detail." PLoS Comput Biol 6.6 (2010): e1000815.*

Wolfram, S. Programming with Natural Language Is Actually Going to Work. Nov. 16, 2010. [retrieved from <http://blog.stephenwolfram.com/2010/11/programming-with-natural-language-is-actually-going-to-work>].[retrieved on Jan. 3, 2017].*

Wolfram, S. "Programming with Natural Language is Actually Going to Work". Nov. 16, 2010. [retrieved from url <http://web.archive.org/web/20101120010854/http://blog.wolfram.com/2010/11/16/programming-with-natural-language-is-actually-going-to-work>. <retrieved Jan. 3, 2017>.*

Bohte, "Spiking Nueral Networks" Doctorate at the University of Leiden, Holland, Mar. 5, 2003, pp. 1-133 [retrieved on Nov. 14, 2012]. Retrieved from the internet: <URL: http://homepages.cwi.nl/~sbohte/publication/phdthesis.pdf>.

Fidjeland et al. "Accelerated Simulation of Spiking Neural Networks Using GPUs" WCCI 2010 IEEE World Congress on Computational Intelligence, Jul. 18-23, 2010—CCIB, Barcelona, Spain, pp. 536-543, [retrieved on Nov. 14, 2012]. Retrieved from the Internet: <URL: http://www.doc.ic.ac.uk/~mpsha/IJCNN10b.pdf>.

PCT International Search Report and Written Opinion for Int'l application No. PCT/US2012/055933, dated Dec. 4, 2012.

Cuntz et al., "One Rule to Grow Them All: A General Theory of Neuronal Branching and Its Paractical Application" PLoS Computational Biology, 6 (8), Published Aug. 5, 2010.

Fidjeland et al. "Accelerated Simulation of Spiking Neural Networks Using GPUs" WCCI 2010 IEEE World Congress on Computational Intelligience, Jul. 18-23, 2010—CCIB, Barcelona, Spain, pp. 536-543, [retrieved on Nov. 14, 2012]. Retrieved from the Internet: <URL:http://www.doc.ic.ac.ukl-mpsha/IJCNN10b.pdf>.

Gluck, "Stimulus Generalization and Representation in Adaptive Network Models of Category Learning" Psychological Science, vol. 2, No. 1, Jan. 1991, pp. 50-55.

Izhikevich, "Polychronization: Computation with Spikes", Neural Computation, 25, 2006, 18, 245-282.

Karbowski et al., "Multispikes and Synchronization in a Large Neural Network with Temporal Delays", Neural Computation 12, 1573-1606 (2000)).

(56) References Cited

OTHER PUBLICATIONS

Khotanzad, "Classification of invariant image representations using a neural network" IEEF. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf>.

Laurent, "The Neural Network Query Language (NNQL) Reference" [retrieved on Nov. 12, 2013]. Retrieved from the Internet: <URL https://code.google.com/p/nnql/issues/detail?id=1>.

Laurent, "Issue 1—nnql—Refactor Nucleus into its own file—Neural Network Query Language" [retrieved on Nov. 12, 2013]. Retrieved from the Internet: <URL:https:l/code.google.com/p/nnql/issues/detail?id=1 >.

Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu/viewdoc/download?doi=10.1.1.5.4346&rep=rep1&type=pdf.

Schemmel et al., Implementing synaptic plasticity in a VLSI spiking neural network model in Proceedings of the 2006 International Joint Conference on Neural Networks (IJCNN'06), IEEE Press (2006) Jul. 16-21, 2006, pp. 1-6 [online], [retrieved on Dec. 10, 2013]. Retrieved from the Internet <URL: http://www.kip.uni-heidelberg.de/veroeffentlichungen/download.cgi/4620/ps/1774.pdf>.

Simulink® model [online], [Retrieved on Dec. 10, 2013] Retrieved from <URL: http://www.mathworks.com/products/simulink/index.html>.

Brette et al., Brian: a simple and flexible simulator for spiking neural networks, The Neuromorphic Engineer, Jul. 1, 2009, pp. 1-4, doi: 10.2417/1200906.1659.

Goodman et al., Brian: a simulator for spiking neural networks in Python, Frontiers in Neuroinformatics, Nov. 2008, pp. 1-10, vol. 2, Article 5.

Djurfeldt, Mikael, The Connection-set Algebra: a formalism for the representation of connectivity structure in neuronal network models, implementations in Python and C++, and their use in simulators, BMC Neuroscience , Jul. 18, 2011, p. 1, 12(Suppl 1):P80.

Gewaltig et al., NEST (NEural Simulation Tool), Scholarpedia, 2007, pp. 1-15, 2(4):1430, doi:10.4249/scholarpedia.1430.

Gleeson et al., ) NeuroML: A Language for Describing Data Driven Models of Neurons and Networks with a High Degree of Biological Detail, PLoS Computational Biology, Jun. 2010, pp. 1-19. vol. 6. Issue 6.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 10.3389/conf.fninf.2011.08.00098.

Davison et al., PyNN: a common interface for neuronal network simulators, Frontiers in Neuroinformatics, Jan. 2009, pp. 1-10, vol. 2, Article 11.

Graham, Lyle J., The Surf-Hippo Reference Manual, http://www.neurophys.biomedicale.univ-paris5.fr/~graham/surf-hippo-files/Surf-Hippo%20Reference%20Manual.pdf, Mar. 2002, pp. 1-128.

PCT International Search Report for PCT/US2013/032546 dated Jul. 11, 2013.

Floreano et al., "Neuroevolution: from architectures to learning" Evol. Intel. Jan. 2008 1:47-62, [retrieved Dec. 30, 2013] [retrieved online from URL:<http://inforscience.epfl.ch/record/112676/files/FloreanoDuerrMattiussi2008.pdf>.

Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org>.

Izhikevich, "Relating STDP to BCM", Neural Computation 15, 1511-1523 (2003).

Nichols, A Reconfigurable Computing Architecture for Implementing Artificial Neural Networks on FPGA, Master's Thesis, The University of Guelph, 2003, pp. 1-235.

Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].

PCT International Search Report for PCT/US2013/052127 dated Dec. 26, 2013.

PCT International Search Report for PCT/US2013/055381 dated Nov. 14, 2013.

Sinyavskiy et al. "Reinforcement learning of a spiking neural network in the task of control of an agent in a virtual discrete environment" Rus. J. Nonlin. Dyn., 2011, vol. 7, No. 4 (Mobile Robots), pp. 859-875, chapters 1-8 (Russian Article with English Abstract).

Szatmary et al., "Spike-timing Theory of Working Memory" PLoS Computational Biology, vol. 6, Issue 8, Aug. 19, 2010 [retrieved on Dec. 30, 2013]. Retrieved from the Internet: <URL: http://www.ploscompbiol.org/article/info%3Adoi%2F10.1371%2Fjournal.pcbi.1000879#>.

Fidjeland et al., Accelerated Simulation of Spiking Neural Networks Using GPUs [online],2010 [retrieved on Jun. 15, 2013], Retrieved from the Internet: URL:http://ieeexplore.ieee.org/xpls/abs_all.jsp?ammber=5596678&tag=1.

Sjostrom et al., 'Spike-Timing Dependent Plasticity' Scholarpedia, 5(2):1362 (2010), pp. 1-18.

Sinyavskiy O. Yu.: 'Obuchenic s podkrepleniem spaikovoy neiroiniy seti v zadache upravleniya agentom v diskretnoy virtualnoy srede.' Nelineinaya Dinamika vol. T. 7., No. 24, 2011, pp. 859-875.

Aleksandrov (1968), Stochastic optimization, Engineering Cybernetics, 5, 1116.

Baras et al., (2007), Reinforcement learning, spike-time-dependent plasticity, and the BCM rule, Neural Comput 19, 22452279.

Bartlett et al., (2000), A biologically plausible and locally optimal learning algorithm for spiking neurons, Retrieved from http://arp.anu.edu.au/ftp/papers/jon/brains.pdf.gz.

Baxter et al., (2000), Direct gradient-based reinforcement learning, In Proceedings of the International Symposium on Circuits and Systems, (pp. III-271-274).

Bohte et al., (2000), SpikeProp: backpropagation for networks of spiking neurons, In Proceedings of ESANN'2000, (pp. 419-424).

Bohte (2005), A computational theory of spike-timing dependent plasticity: achieving robust neural responses via conditional entropy minimization, SEN-E0505.

Booij (2005), A Gradient Descent Rule for Spiking Neurons Emitting Multiple Spikes, Information Processing Letters n. 6, v.95, 552558.

El-Laithy (2011), A reinforcement learning framework for spiking networks with dynamic synapses, Comput Intell Neurosci.

Fletcher (1987), Practical methods of optimization, New York, NY: Wiley-Interscience.

Florian (2005), A reinforcement learning algorithm for spiking neural networks SYNASC '05 Proceedings of the Seventh International Symposium on Symbolic and Numeric Algorithms for Scientific Computing.

Fu (2008), What You Should Know About Simulation and Derivatives Naval Research Logistics, vol. 55, No. 8, 723-736.

Gerstner (2002), Spiking neuron models: single neurons, populations, plasticity, Cambridge, U.K.: Cambridge University Press.

Fu et al, (1995), "Likelihood ratio gradient estimation for regenerative stochastic recursion", Advances in Applied Probability, 27, 4, 1019-1053.

Glynn (1995), Likelihood ratio gradient estimation for regenerative stochastic recursions, Advances in Applied Probability, 27, 4, 10191053.

Izhikevich, 'Simple Model of Spiking Neurons', IEEE Transactions on Neural Networks, vol. 14, No. 6, Nov. 2003, pp. 1569-1572.

Izhikevich (2007), Solving the distal reward problem through linkage of STDP and dopamine signaling, Cerebral Cortex, vol. 17, pp. 244352.

Kiefer (1952), Stochastic Estimation of the Maximum of a Regression Function, Annals of Mathematical Statistics 23, #3, 462466.

Pfister (2003), Optimal Hebbian Learning: A Probabilistic Point of View, In ICANN Proceedings. Springer.

Larochelle et al., (2009), Exploring Strategies for Training Deep Neural Networks, J. of Machine Learning Research, v. 10, pp. 1-40.

(56) References Cited

OTHER PUBLICATIONS

Klampfl (2009), Spiking neurons can learn to solve information bottleneck problems and extract independent components, Neural Computation, 21(4), pp. 911-959.
Pfister (2006), Optimal Spike-Timing Dependent Plasticity for Precise Action Potential Firing in Supervised Learning, Neural computation ISSN 0899-7667, 18(6).
Reiman et al. (1989). Sensitivity analysis for simulations via likelihood ratios. Oper Res 37, 830844.
Robbins (1951), A Stochastic Approximation Method, Annals of Mathematical Statistics 22, #3, 400407.
Kleijnen et al., "Optimization and sensitivity analysis of computer simulation models by the score function method", Invited Review European Journal of Operational Research, Mar. 1995.
Rumelhart et al., (1986), Learning representations by back-propagating errors, Nature 323 (6088), pp. 533536.
Rumelhart (1986), Learning internal representations by error propagation, Parallel distributed processing, vol. 1 (pp. 318362), Cambridge, MA: MIT Press.
Sinyavskiy, et al. (2010), "Generalized Stochatic Spiking Neuron Model and Extended Spike Response Model in Spatial-Temporal Impulse Pattern Detection Task", Optical Memory and Neural Networks (Information Optics), 2010, vol. 19, No. 4, pp. 300-309.
Tishby et al., (1999), The information bottleneck method, In Proceedings of the 37th Annual Allerton Conference on Communication, Control and Computing, B Hajek & RS Sreenivas, eds., pp. 368-377, University of Illinois.
Toyoizumi (2007), Optimality Model of Unsupervised Spike-Timing Dependent Plasticity: Synaptic Memory and Weight Distribution, Neural Computation, 19 (3).
Toyoizumi et al., (2005), Generalized Bienenstock-Cooper-Munro rule for spiking neurons that maximizes information transmission, Proc. Natl. Acad. Sci. USA, 102, (pp. 52395244).
Weber et al., (2009), Goal-Directed Feature Learning, In: Proc, International Joint Conference on Neural Networks, 3319 3326.
Weaver (2001), The Optimal Reward Baseline for Gradient-Based Reinforcement Learning, UAI 01 Proceedings of the 17th Conference in Uncertainty in Artificial Intelligence (pp. 538-545). Morgan Kaufman Publishers.
Williams (1992), Simple Statistical Gradient-Following Algorithms for Connectionist Reinforcement Learning, Machine Learning 8, 229256.
Yi (2009), Stochastic search using the natural gradient, ICML '09 Proceedings of the 26th Annual International Conference on Machine Learning. New York, NY, USA.
Fyfe et al., (2007), Reinforcement Learning Reward Functions for Unsupervised Learning ISNN '07 Proceedings of the 4th international symposium on Neural Networks: Advances in Neural Networks.
Abbott L.F., et al., "Synaptic plasticity: taming the beast," Nature Neuroscience, Nov. 2008, vol. 3, 1178-1183.
Amari S., et al., "Why natural gradient?," Acoustics, Speech and Signal Processing, Proceedings of the 1998 IEEE International conference, 1998, vol. 2, pp. 1213-1216.
Brette., "On the design of script languages for neural simulation", Laboratoire Psychologie de la Perception, CNRS Universite Paris Descartes, Paris, France, 7 pp.
Brette., "Vectorised algorithms for spiking neural network simulation" Oct. 2010, 23pp.

Farabet C., et al., "NeuFlow: A Runtime Reconfigurable Dataflow Processor for Vision", IEEE Computer Society Conference on Computer Vision and Pattern Recognition Workshops (CVPRW), 2011, pp. 109-116.
Gewaltig, et al., "NEST by example: an introduction to the neural simulation tool NEST", Computational Systems Neurobiology Springer, Dordrecht, 2012, 27 pages.
Goodman., "Code Generation: A Strategy for Neural Network Simulators", Neuroinform, Springer Science + Business Media, LLC, Human Press, Sep. 2010, 14 pp.
Goodman, et al., "The Brian Simulator", Frontiers in Neuroscience, Focused Review, Sep. 15, 2009, pp. 192-197.
Jin X. et al., "Implementing Spike-Timing-Dependent Plasticity on SpiNNaker Neuromorphic Hardware", Proceedings of the 2010 International Joint Conference on Neural Networks (IJCNN '10), (Jul. 18, 2010), XP031771405, DOI: 10.1109/IJCNN.2010.5596372, sections III and v.
Morrison et al., "Advancing the Boundaries of High-Connectivity Network Simulation with Distributed Computing", Neural Compuation 17, 2005, pp. 1775-1801.
Nageswaran J.M., et al., "Computing Spike-based Convolutions on GPUs", IEEE International Symposium on Circuits and Systems, 2009, ISCAS 2009, May, pp. 1917-1920.
Neuflow., "A Data Flow Processor", www.neuflow.org/category/neuflow-2/, Dec. 2010, 3 pp.
Pecevski., et al., PCSIM: a parallel simulation environment for neural circuits fully integrated with Python [online], 2009 [retrieved on Jan. 12, 2015]. Retrieved from the Internet:<URL:http://www.ncbi.nlm.nih.gov/pmc/articles/PMC2698777/pdf/fninf-03-011 .pdf>.
Plesser et al., "Efficient Parallel Simulation of Large-Scale Neuronal Networks on Clusters of Multiprocessor Computers", Springer-Verlag Berlin Heidelberg, 2007, 10pp.
Rosenstein M T et al., "Supervised learning combined with an actor-critic architecture," Technical Report 02-41, Department of Computer Science, University of Massachusetts, Amherst, Oct. 18, 2002, pp. 1-10.
Taiwan Search Report—TW101133859—TIPO—Oct. 15, 2015.
Wolfram S., et al., "Programming with Natural Language Is Actually Going to Work", Nov. 16, 2010, 7 pages. Retrieved from Internet: http://blog.stephenwolfram.com/2010/11/programming-with-natural-language-is-actually-going-to-work>]. [retrieved on Jan. 3, 2017].
Cornelis et al., "Neurospaces: Towards Automated Model Partitioning for Parallel Computers," Neurocomputing, Elsevier, Amsterdam, NL, Apr. 29, 2007 (Apr. 29, 2007), vol. 70, No. 10-12, pp. 2117-2121, XP022053054, ISSN: 0925-2312, DOI: 10.1016/J.NEUCOM.2006.10.140.
Fan H., et al., "Advanced Neural Network Description Language and Its Editor/compiler", Mini-Micro Computer Systems, Dec. 31, 1992, vol. 13 Issue 12, 18 pages.
Korb T., et al., "A Declarative Neural Network Description Language," Microprocessing and Microprogramming, Elsevier Science Publishers, BV., Amsterdam, NL, Aug. 1, 1989 (Aug. 1, 1989), vol. 27(1-5), pp. 181-188, XP026658288, ISSN: 0165-6074, DOI: 10.1016/0165-6074(89)90043-4 [retrieved on Aug. 1, 1989].
Strey A: "EpsiloNN—A Specification Language for the Efficient Parallel Simulation of Neural Networks," Biological and Artificial Computation: From Neuroscience to Technology, Jan. 1, 1997 (Jan. 1, 1997), pp. 714-722, XP055350267, Retrieved from the Internet: URL:ftp://neuro.informatik.uni-ulm.de/ni/alfred/iwann97.ps.gz.
Supplementary European Search Report—EP13760351—Search Authority—Munich—Mar. 8, 2017.

* cited by examiner

HIGH LEVEL NEUROMORPHIC NETWORK DESCRIPTION APPARATUS AND METHODS

CROSS-REFERENCE TO RELATED APPLICATIONS

The present application is a continuation-in-part of U.S. patent application Ser. No. 13/239,123, filed Sep. 21, 2011, entitled "ELEMENTARY NETWORK DESCRIPTION FOR NEUROMORPHIC SYSTEMS, which is expressly incorporated by reference herein.

This application is related to a co-owned U.S. patent application Ser. No. 13/239,163 entitled "ELEMENTARY NETWORK DESCRIPTION FOR EFFICIENT IMPLEMENTATION OF EVENT-TRIGGERED PLASTICITY RULES IN NEUROMORPHIC SYSTEMS" filed on Sep. 21, 2011, a co-owned U.S. patent application Ser. No. 13/239,155 entitled "ELEMENTARY NETWORK DESCRIPTION FOR EFFICIENT MEMORY MANAGEMENT IN NEUROMORPHIC SYSTEMS" filed on Sep. 21, 2011, and a co-owned U.S. patent application Ser. No. 13/239,148 entitled "ELEMENTARY NETWORK DESCRIPTION FOR EFFICIENT LINK BETWEEN NEURONAL MODELS NEUROMORPHIC SYSTEMS" filed on Sep. 21, 2011, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

COMPUTER PROGRAM LISTING APPENDIX ON CD-ROM

The file of this patent includes duplicate copies of compact disc (CD-ROM) with forty six (46) read-only memory files in ASCII file format. The file details are presented in Table 1 below. These ASCII files contain lines of code which represent exemplary implementations of a Computer Program Listing for this disclosure. This CD-ROM and each of the files contained thereon and listed in Table 1 is incorporated herein by reference in its entirety.

TABLE 1

| Filename | Creation Date | Creation Time | Size (bytes) |
|---|---|---|---|
| synStructure.cpp | Jun. 12, 2010 | 14:51 | 174 |
| connStructurecopy.cpp | Jul. 1, 2010 | 23:15 | 3,476 |
| connStructure.cpp | Sep. 21, 2010 | 17:13 | 3,521 |
| randConnStructure.cpp | Sep. 21, 2010 | 15:40 | 1,695 |
| eContainer.cpp | Jun. 4, 2010 | 9:47 | 200 |
| nStructure.cpp | Jun. 24, 2010 | 17:06 | 216 |
| noFactory.cpp | Jun. 23, 2010 | 16:10 | 328 |
| endO.cpp | Jun. 10, 2010 | 0:31 | 279 |
| nO.cpp | Jun. 30, 2010 | 12:43 | 226 |
| endObjects.cpp | Sep. 16, 2010 | 18:07 | 530 |
| nContainer.cpp | Jun. 9, 2010 | 22:36 | 332 |
| main.cpp | Sep. 28, 2010 | 11:57 | 3,153 |
| simple_instances_two_units_xy.end | Jun. 4, 2010 | 9:47 | 53,710 |
| simple_two_units_xy.end | Jun. 4, 2010 | 9:48 | 6,330 |
| hashdefs.h | Oct. 8, 2010 | 10:39 | 210 |

TABLE 1-continued

| Filename | Creation Date | Creation Time | Size (bytes) |
|---|---|---|---|
| gluSynapse.h | Sep. 16, 2010 | 14:34 | 1,515 |
| synStructure.h | Jun. 22, 2010 | 11:42 | 1,099 |
| gabaSynapse.h | Sep. 16, 2010 | 14:34 | 1,536 |
| inhNeuron.h | Jul. 1, 2010 | 10:12 | 1,263 |
| layer1exc.h | Sep. 16, 2010 | 10:51 | 1,262 |
| layer1to2exc_copy.h | Sep. 21, 2010 | 17:03 | 3,170 |
| excNeuron.h | Jul. 1, 2010 | 10:12 | 1,262 |
| layer2inh.h | Sep. 16, 2010 | 10:52 | 1,260 |
| layer2to2inh_copy.h | Sep. 21, 2010 | 16:45 | 2,136 |
| layer2to2inh.h | Sep. 21, 2010 | 17:09 | 1,844 |
| layerSynapse.h | Sep. 28, 2010 | 12:00 | 3,043 |
| eSynStruct.h | Jun. 4, 2010 | 9:47 | 2,438 |
| endObjects.h | Sep. 16, 2010 | 18:07 | 391 |
| nContainer.h | Jun. 23, 2010 | 20:04 | 1,509 |
| newNetworkObject.h | Jun. 25, 2010 | 9:50 | 1,768 |
| nGroup.h | Jul. 1, 2010 | 10:12 | 1,739 |
| endO.h | Sep. 17, 2010 | 11:31 | 8,931 |
| nO.h | Jul. 1, 2010 | 10:08 | 4,381 |
| eMCN.h | Jun. 9, 2010 | 22:20 | 917 |
| noFactory.h | Jun. 23, 2010 | 16:10 | 889 |
| SpNet.h | Sep. 16, 2010 | 11:32 | 2,912 |
| nSpace.h | Jul. 1, 2010 | 10:09 | 647 |
| eContainer.h | Jun. 10, 2010 | 0:06 | 1,819 |
| nStructure.h | Jul. 1, 2010 | 10:08 | 2,509 |
| nSurface.h | Jul. 1, 2010 | 10:09 | 655 |
| connStructure.h | Sep. 24, 2010 | 18:06 | 5,712 |
| randConnStructure.h | Jul. 12, 2010 | 9:58 | 1,845 |
| randSynStructure.h | Jun. 22, 2010 | 18:26 | 2,992 |
| cNO.h | Jul. 1, 2010 | 10:09 | 640 |
| layer1to2exc.h | Sep. 21, 2010 | 17:05 | 2,828 |
| testRand.h | Jun. 30, 2010 | 22:53 | 1,007 |

BACKGROUND

Field of the Disclosure

The present innovation relates to efficient design and implementation of artificial neural networks.

Description of Related Art

Most existing neuronal models and systems include networks of simple units, called neurons, which interact with each other via connections called synapses. The information processing in such neuronal systems may be carried out in parallel.

There are many specialized software tools that may help neuroscientists simulate models of neural systems. Examples of these tools may include high-level implementations such as one or more of NEURON, GENESIS, NEST, BRIAN, and/or other high-level implementations may be designed primarily for use by neuroscientists. Such tools may typically require substantial specialized knowledge, may be cumbersome, and may require customization in order to achieve efficient performance during simulations that are executed using specific software and hardware engines, particularly when real-time performance is required, as in autonomous robotics applications.

Similarly, low-level implementations such as one or more of assembly languages, low-level virtual machine (LLVM) language, Java Bytecode, chip-specific instruction sets, and/or other low-level implementations may be designed for efficient hardware implementations on x86, ARM™, and/or other silicon chips. However, such implementations may be unsuitable for parallel simulations of neuronal systems, mostly because the silicon chips are not designed for such parallel neuronal simulations.

Overall, existing approaches have substantial shortcomings as they do not provide sufficient flexibility in designing neural networks, require expert knowledge, and/or platform specific customization in order to take advantage of specialized hardware.

Accordingly, there is a salient need for a universal high level network description for defining network architectures in a simple and unambiguous way that is both human-readable and machine-interpretable.

SUMMARY

The present disclosure satisfies the foregoing needs by providing, inter alia, apparatus and methods for high level network description for neuromorphic systems.

One aspect of the disclosure relates to one or more systems and/or computer-implemented methods for effectuating a neural network using an instruction set. In one implementation, the method may comprise providing a representation of the neural network. The representation may comprise a plurality of instructions of the instruction set. The representation may be compiled into to machine executable format. The instruction set may comprise a structured language consistent with English language structure and grammar.

In some implementations, the instruction set may comprise a first instruction adapted to cause generation of at least one node within the network. The first instruction may comprise a keyword including one or more of CREATE, MAKE, PUT, and/or other keywords.

In some implementations, the at least one node may be characterized by a spatial coordinate. The first instruction may comprise a structured English language statement configured to assign a desired location within the network to the spatial coordinate. The assignment may be performed as a part of the generation of the at least one node. The first instruction may comprise a keyword including one or more of ON, IN, AT, and/or other keywords.

In some implementations, the generation of at least one node may comprise generation of a first node and a second node. The instruction set may comprise a second instruction configured to cause a connection between the first node and the second node.

In some implementations, the connection may comprise a synapse, a junction, and/or another connection.

In some implementations, the generation of at least one node may comprise generation of a plurality of nodes. The plurality may comprise the first node and the second node. The second instruction may comprise a Boolean expression configured to select two subsets within the plurality of nodes and/or to cause a plurality of connections between nodes of one of the two subsets and nodes of another of the two subsets. The second instruction may comprise a keyword including one or more of CONNECT, LINK, PROJECT, and/or other keywords. The Boolean expression may comprise a keyword including one or more of AND, NOT, OR, and/or other keywords.

Some implementations may include a method of programming a computerized apparatus. In one implementation, the method may comprise representing a neural network using a plurality of instructions of an instruction set. The representation may be compiled into a machine representation for execution by the computerized apparatus. The instruction set may comprises a structured language consistent with English language structure and grammar.

In some implementations, the network may comprise a plurality of elements. Individual ones of the plurality of elements may have a tag associated therewith. The instruction set may comprise a first instruction configured to identify a subset of the plurality of elements based on the tag.

In some implementations, compiling of the instruction set may be effected by a database configured to store a plurality of tags. The plurality of tags may comprise the tag.

In some implementations, the instruction set may comprise a second instruction configured to effect assignment of a new tag to the subset. The second instruction may comprise a keyword including one or more of TAG, ASSIGN, MARK, and/or other keywords.

In some implementations, the instruction set may comprise a Boolean expression consistent with a structured English representation. The structured English representation may enable machine execution of the Boolean expression by an implicit assignment of a logical AND operation between two Boolean variables of the Boolean expression. The Boolean variables may be separated by a separator keyword.

Some implementations may include a method of operating a neuromorphic computerized apparatus. In one implementation, the neuromorphic computerized apparatus may comprise a nonvolatile storage medium storing one or more of an instruction set, compiling kernel, processing module, and/or other information. The method may comprise providing a representation of a neural network to the processing module. The representation may comprise a plurality of instructions included in the instruction set. The representation may be encoded into hardware independent format by the processing module using the kernel. The instruction set may comprise a structured language consistent with English language structure and grammar.

In some implementations, the hardware independent format may be configured to enable conversion of the representation into a plurality of machine executable instructions. The plurality of machine executable instructions may effect operation of the neural network.

In some implementations, the hardware independent format may comprise Elementary Network Description (END) format. The machine executable instructions may include one or more of central processing unit (CPU) instructions, graphics processing unit (GPU) instructions, field programmable gate array (FPGA) instructions, and/or other machine executable instructions.

In some implementations, the machine format may comprise a plurality of functions configured for execution by the processing module.

In some implementations, the computerized apparatus may comprise a speech input apparatus. Providing the representation may be effected by a user of the computerized apparatus. The user may speak individual ones of the plurality of instructions such that a given spoken instruction is received by the speech input apparatus.

In some implementations, the speech input apparatus may be operably coupled to the kernel. The kernel may comprise a speech-recognition module configured to translate digitized user speech into one or more instructions of the instruction set.

In some implementations, the instruction set may comprise a first instruction configured to effect generation of at least one node within the network. The at least one node may be characterized by a spatial coordinate. The first instruction may comprise a structured English language statement configured to assign a desired location within the network to the spatial coordinate. The assignment may be effected substantially during creation of the at least one node.

In some implementations, the generation of the at least one node may comprise generation of a first node and a second node. The instruction set may comprise a second instruction configured to effect a connection between the first node and the second node.

Some implementations may include neuronal network logic. In one implementation, the neuronal network logic may comprise a series of computer program steps or instructions executed on a digital processor. The logic may comprise hardware logic. Hardware logic may be embodied in one or more of an ASIC, FPGA, and/or other integrated circuit.

Some implementations may include a computer readable storage medium having at least one computer program stored thereon. The program may be executable to implement an artificial neuronal network.

Some implementations may include a system comprising one or more of an artificial neuronal (e.g., spiking) network having a plurality of nodes associated therewith, a controlled apparatus (e.g., robotic or prosthetic apparatus), and/or other components.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

Figure 1:
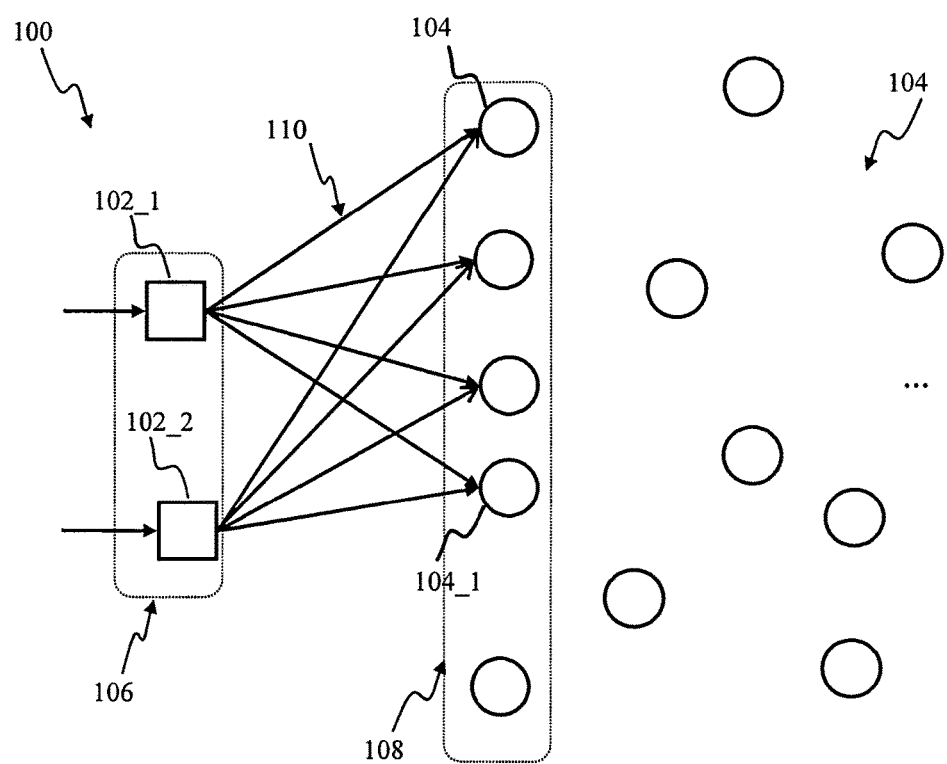
FIG. 1 is a block diagram illustrating an artificial neural network comprising a plurality of nodes and node connections, in accordance with one or more implementations.

All Figures disclosed herein are © Copyright 2012 Brain Corporation. All rights reserved.

DETAILED DESCRIPTION

Implementations of the present disclosure will now be described in detail with reference to the drawings, which are provided as illustrative examples so as to enable those skilled in the art to practice the disclosure. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or similar parts.

Where certain elements of these implementations can be partially or fully implemented using known components, only those portions of such known components that are necessary for an understanding of the present disclosure will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" may be optical, wireless, infrared, and/or another type of communication medium. The exact topology of the bus could be for example standard "bus", hierarchical bus, network-on-chip, address-event-representation (AER) connection, and/or other type of communication topology used for accessing, e.g., different memories in pulse-based system.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB™, PASCAL, Python, assembly language, markup languages (e.g., HTML, SGML, XML, VoXML), object-oriented environments (e.g., Common Object Request Broker Architecture (CORBA)), Java™ (e.g., J2ME, Java Beans), Binary Runtime Environment (e.g., BREW), and/or other programming languages and/or environments.

As used herein, the terms "connection", "link", "transmission channel", "delay line", "wireless" may include a causal link between any two or more entities (whether physical or logical/virtual), which may enable information exchange between the entities.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the term "synaptic channel", "connection", "link", "transmission channel", "delay line", and "communications channel" include a link between any two or more entities (whether physical (wired or wireless), or logical/virtual) which enables information exchange between the entities, and may be characterized by a one or more variables affecting the information exchange.

As used herein, the term "Wi-Fi" includes one or more of IEEE-Std. 802.11, variants of IEEE-Std. 802.11, standards related to IEEE-Std. 802.11 (e.g., 802.11a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

Overview

The present disclosure provides, among other things, a computerized high level network description apparatus and methods that may be configured to define neuronal network architectures in a simple and unambiguous way.

In some implementations, a computerized apparatus may be configured to implement a High Level Network Description (HLND) kernel. The HLND kernel may enable users to define neuromorphic network architectures using a unified and unambiguous representation that is both human-readable and machine-interpretable.

In some implementations, the HLND format may be used to define nodes types, node-to-node connection types, instantiate node instances for different node types, dynamically identify and/or select subsets of the network using tags, generate instances of connection between these nodes using such subsets, and/or other information associated with nodes and/or tags.

The HLND format may provide some or all of the flexibility required by computational neuroscientists and may provide a user-friendly interface for users with limited experience in modeling neurons.

In some implementations, the HLND kernel may comprise an interface to Elementary Network Description (END). The END engine may be configured for efficient representation of neuronal systems in hardware-independent manner and/or may enable seamless translation of HLND model description into hardware instructions for execution by various processing modules.

In some implementations, the HLND framework may comprise a graphical user interface (GUI) configured to enable users to, inter alia, create nodes, select node subsets, connect selected subsets using graphical actions via the GUI, and/or perform other operations consistent with the disclosure. The GUI engine may be configured to generate HLND statements, which may correspond to the above user actions, without further input from the user. The HLND framework may be configured to convert HLND statements into a graphical representation of the network that is presented via the GUI. The HLND may include one or more components including (i) the network graphical depiction using the GUI, (ii) the corresponding list of HLND statements, and/or other components. One or more components of the HLND may be configured to consistently represent the same information about the network, as changes in one representation may be consistently applied to the other representation thereby reflecting some or all of the modifications to the network.

In some implementations, the HLND may be applicable to arbitrary graph structures (e.g., neural network with arbitrarily complex architecture).

DETAILED DESCRIPTION

Detailed descriptions of the various implementations of the apparatuses and methods of the disclosure are now provided. Although certain aspects of the disclosure can best be understood in the context of the High Level Network Description format used for designing neural network architecture, the disclosure is not so limited and implementations of the disclosure may be used for implementing an instruction set that is optimized for efficient representation of other systems (e.g., biological or financial) in a hardware-independent manner.

Implementations of the disclosure may be, for example, deployed in a hardware and/or software implementation of a neuromorphic computer system. In some implementations, a robotic system may include a processor embodied in an application specific integrated circuit, which may be adapted or configured for use in an embedded application (such as a prosthetic device).

FIG. 1 illustrates one implementation of neuronal network configuration useful to the disclosure. The network 100 shown in FIG. 1 is comprised of nodes of different types (the node types 102, 104 in FIG. 1). As described in detail below, the HLND framework allows users to dynamically select an arbitrary subset of network nodes (the subsets 106, 108 in FIG. 1) and interconnect nodes of the selected subsets via connections (the connections 110 in FIG. 1). Some nodes (e.g., the node 104_1) of the network 100 may receive inputs from more than one node (e.g., the nodes 102_1, 102_2 in FIG. 1). Conversely, some nodes (such as the nodes 102_1, 102_2) may deliver outputs to several nodes, as illustrated in FIG. 1.

HLND Framework Design Overview

According to one or more implementations, the exemplary HLND framework may be configured to facilitate design of neural networks, such as network 100 of FIG. 1. Some implementations may provide an ability to describe neuronal network of an arbitrary complexity. Some implementations may facilitate use of pre-defined node and/or pre-defined connection types for the network generation process. That is, multiple instances of different node types may be generated, laid-out, and/or connected using multiple instances of different connection types. Some implementations may provide a flexible definition of new node types such that a new node type may comprise an implementation of an elementary network description (END) unit class and/or an implementation of a Network Object (e.g., a layout of nodes, a set of connectivity, and/or a combination of these). The newly defined node types may be used in the network generation process. The END framework is described in U.S. patent application Ser. No. 13,239,123 entitled "ELEMENTARY NETWORK DESCRIPTION FOR NEUROMORPHIC SYSTEMS", incorporated supra. Some implementations may provide a flexible definition of connection types. A connection type may include an implementation of an END Junction Class, an END Synapse Class, and/or other classes. In one implementation, the newly defined connection types may be used in the network generation process. Some implementations may facilitate use of universal tags (or labels) for some or all of the network elements including nodes, connections, collections of nodes, and/or other network elements. In some implementations, tags may be used to identify groups of nodes and/or connections. Tags may be used to dynamically select parts of the network. One or more Boolean operations, such as AND, OR, NOT, and/or other Boolean operations may be applied to tags. Some implementations may provide an ability to implement a HLND network using a graphical user interface (GUI). Individual description constructs may correspond to a user action in the GUI. In some implementations, models of moderate complexity may be built using a HLND GUI interface without requiring the use of a keyboard. In some implementations, the HLND GUI may be operated using a touch screen, a light pen input device, and/or other input technique. Some implementations may facilitate presentation of HLND statements for defining network anatomy. Defining network anatomy may include laying out nodes and/or connections in a user-readable (natural English) language to facilitate easy understanding for non-computer expert network designers. Some implementations may provide an ability to use HLND to generate END instances.

Network Definition Methods

Defining a neural network may comprise defining how many and/or what type of nodes to create, how to lay out these nodes, how to connect these node instances (e.g., the network layout of FIG. 1), and/or other operations. In some implementations, the HLND definition method comprises (1) defining new node types and/or connection types for the new node types, (2) defining a node layout within the network (e.g., how many and/or what type of nodes to create, and how to arrange these nodes within the network that is being created), (3) defining how the nodes connect to one another, and/or other operations. During neural network construction, the above steps 1-3 may be individually and/or sequentially repeated multiple times. In some implementations, the above step 1 may be skipped and pre-defined classes (defining the desired node type) may be used instead in defining the network.

In some implementations, a dedicated software package may be configured to (i) process the HLND statements that define the network and/or (ii) instantiate the network nodes and connections. This processing and/or instantiation may be subject to one or more constraints including (i) only the defined node types and the defined connection types can be instantiated and used in the HLND network definition process, (ii) only the connections between the existing node instances can be instantiated, and/or other constraints. In other words, only connections corresponding to the defined node instances may be used in the HLND process of defining the connections, in accordance with one or more implementations. In some implementations, the dedicated software package may comprise the END engine, which may be configured to generate the END instance of network models, as described in a co-owned U.S. patent application Ser. No. 13/239,123 entitled "ELEMENTARY NETWORK DESCRIPTION FOR NEUROMORPHIC SYSTEMS", incorporated supra.

Defining Node Types

The definition of a node type may provide the implementation instructions of the node, which may be configured to instruct a network processing apparatus to perform specific steps during instantiation of the node in accordance with the node type. In some implementations, the node definition may further specify internal implementation of the node type (for example, specify the dynamics of the neuron type). In one or more implementations, the node definition may comprise definitions of input ports and/or output ports for the node In some implementations, the node type may be defined as a Simple Node, where the node definition specifies the "internals" of that node. Internals of a node may include the implementation of an END unit (i.e., a neuron) and/or an END implementation of a neuronal compartment.

In some implementations, the node type may be defined as a complex Network Object, which may provide instructions on how to instantiate pre-defined node types, instructions on how to connect the nodes, and/or other instructions. Instructions on how to connect nodes may include a HLND description of a network of an arbitrary complexity, an algorithm configured to specify details of node and/or connection instance generation, and/or other instructions. It will be appreciated by those skilled in the arts that the term Network Object may be used to describe any network that is implementable using the HLND framework.

Within the HLND framework description, individual node types may comprise intra-node connections and may define interface (or interfaces) for incoming connections and/or outgoing connections.

Node Type as an END Unit

In some implementations, the END Unit class may be generated using node implementation details (e.g., update rule, event rule). See, e.g., U.S. patent application Ser. No. 13/239,123 for additional detail related to the END Unit classes.

Node Type as a Network Object

In some implementations, the definition of a network object may be configured similarly to the definition of a network, with the main difference being that the network object is reusable. That is, multiple instances of the network object may be instantiated. Some or all elements of the network object (e.g., units, tags, and/or other elements) may be scoped—that is, they may have a finite lifetime associated with a particular scope. In some implementations, network objects may be configured to provide an I/O interface that may be used to connect the network object with other nodes. A network object may be similar to a building block in a Simulink® model (see, e.g., http://www.mathworks.com/products/simulink/index.html), a p-cell in a computer aided design (CAD) software, a function/class in C++ language code, and/or other programming elements.

In some implementations, a network object may be allowed to use pre-defined nodes that are defined externally (i.e., outside the scope of this node type). Thus, the parent node (i.e., the network object) and the child node(s) (i.e., the node types used in the network object) may not comprise nodes of the same type. In other words, the definition of an 'X'-type node may not instantiate 'X' type nodes, according to some implementations.

Figure 2:
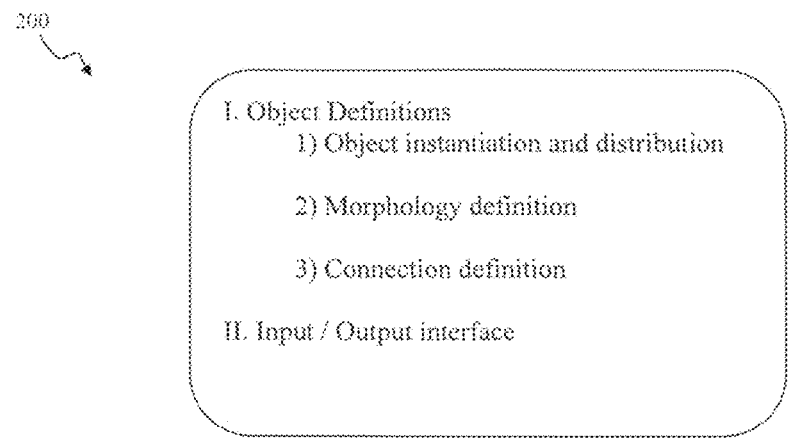
FIG. 2 is a block diagram illustrating a neural node type as a network object, in accordance with one or more implementations.

Referring now to FIG. 2, one exemplary implementation of a network object is illustrated and described in detail. The network object 200 may comprise one or more of a network definition, specification of the object input/output (I/O) interface, and/or other information.

The network definition may specify one or more steps of the object instance generation. The network definition may be implemented via a standard HLND network definition. A standard HLND network definition may comprise an instantiation and/or layout of nodes that specifies the number of instances of each pre-defined node and/or their spatial arrangement using pre-defined distribution functions. A standard HLND network definition may comprise a connectivity description, which may define connectivity between nodes.

In some implementations, the connectivity description may define and/or use spatial projection for the node. By way of non-limiting example, defining spatial projection for a node may include defining axonal and/or dendritic projections for the nodes (e.g., (i) dendritic spread, (ii) distribution of synaptic boutons, (iii) distribution of axon terminals), defining how the axon of a node (e.g., model neuron) connects to the dendrite of another node (e.g., model neurons), and/or defining other information associated with spatial projection for a node.

By way of non-limiting example, the standard HLND network definition may be used in (i) defining a specific layout of pre-defined nodes; (ii) defining a multi-compartmental neuron (e.g., a collection of pre-defined END units connected with pre-defined END junctions); (iii) defining an arbitrarily complex network comprising a plurality of neurons; and/or defining other information associated with the standard HLND network definition. In some implementations, a network may comprise synapses and/or junctions.

In some implementations, the definition of the network may comprise instance generation with an algorithm, which may be configured to describe one or more steps of Network Object instance generation, using the above Object definition. By way of non-limiting example, the algorithm may include one or more of (i) an algorithm that uses pre-defined node types and/or defines the instance generation process of such node types; (ii) an arbitrary algorithm that uses pre-defined node types and/or connection types and/or define the instance generation process of such node and/or connection types; (iii) an algorithm that defines a dendritic tree; and/or other algorithms.

The above exemplary algorithms may utilize multiple pre-defined END unit types implementing neural compartments and/or pre-defined END junction types designed to connect such compartments with the algorithm defining the layout of compartments and the connection between them. (See, e.g., Cuntz H., Forstner, F., Borst. A, and Musser, M. (2010), "One Rule to Grow Them All: A General Theory of Neuronal Branching and Its Practical Application. *PLoS Computational Biology*, 6(8), incorporated herein by reference in its entirety). The I/O interface may specify an input/output connection implemented for the network object.

Definition of Connection Types

Within HLND, definition of a connection type may provide the necessary implementation details (e.g., pre-event rules, post-event rules, update rules, and/or other details) to generate a connection that comprises one or both of (i) an END synapse or (ii) an END junction, in accordance with one or more implementations.

Instantiating Nodes

In some implementations, the HLND may define rules that govern node instantiation. The HLND node instantiation instructions may be subsequently provided to a software package (e.g., the END kernel) that interprets the instructions and instantiates the appropriate nodes. According to some implementations, during instantiation, some or all node types may be treated equally, regardless of whether they are simple nodes (e.g., the END implementation of a neuron) or network objects (e.g., the entire network description). In some implementations, the following information may be needed to instantiate and lay out nodes: (i) node type to be instantiated, (ii) number of instances of the node type to be instantiated, and/or other information.

In a basic form, an HLND instantiation statement may create n instances of a given node type using default definitions corresponding to the node type. During instantiation, additional parameters may be used to, inter alia, (i) set parameters used to initialize the instantiated node types, (ii) set how the instantiated nodes are laid out in space (e.g., how position tags are assigned), (iii) add additional tags to the new node instances, and/or perform other operations associated with HLND instantiation. Within HLND, a defined node type available within the scope of operation may be instantiated without restriction.

In some implementations, position coordinates (i.e., spatial tags) may be assigned to the generated node instances during node instantiation. In order to implement this functionality, the HLND framework may support usage of pre-defined distribution functions that assign spatial tags to each instantiated node. Such a distribution function may be configured to sample n points from a given probability density function. By way of non-limiting example, the HLND statement:

Uniform(n, boundary parameters)

may describe sampling of n points that are uniformly distributed within a space range, defined by the boundary parameters argument. Similarly, the HLND statement:

Normal(n, sigma, boundary parameters)

may describe sampling of n normally distributed points within a space range specified by the boundary parameter.

In addition to the unique id tags that individual generated nodes may have, extra tags may be optionally assigned during the instantiation process and may be used to identify the set of newly instantiated nodes. In some implementations, special reserved tags (e.g., "IN", "OUT", or other special reserved tags) may be used to specify that the generated units are input or output interfaces for the network, therefore making these nodes accessible (readable and/or writable) from outside. Exemplary HLND calls are shown in the Listing 1 below:

Listing 1.

a) create 100 of the 'exc' node types (assuming that the 'exc' END class/network object exists)
    example1_exc_neurons = (100, 'exc')
b) create 200 of the 'exc' node types and distribute them using the given pdf:
    example2_exc_neurons = (200, 'exc', _exc_parameters_, pdf)
c) create 1 node of a network object type that implements the retina (assuming that the 'retina' network object type has been implemented previously):
    example3_retina = (1, 'retina', _retina_parameters_)

Morphology/Extensions

In some implementations, morphology/extensions may be used during connection instantiation. The morphology definition described with respect to FIG. 2 supra, specifies how an instantiated node may project and/or extend into network space. That is, the morphology may define spatial extent where an instantiated node is allowed (i) to "receive" incoming connections from, and/or (ii) to "send" outgoing connections to. Note that, according to some implementations, an addition of a node extension may not alter the size and/or the location of the node. Instead, extensions may enable a node to "search" for other nodes during instantiation of node interconnections. In other words, an extension may provide an additional "view" of a node, which may be used during the process of connecting nodes.

In some implementations, connecting nodes using spatial tags may only be allowed if the nodes are overlapping. Nodes may have a zero extension by default. In some implementations, only co-located nodes may be connected.

In order to extend node connectivity, non-zero node input (dendrite) and node output (axon) projections may be defined. In some implementations, these projections may be used when connecting any two nodes. For example, the output projection of one node may be connected to the input projection of another node.

To create an extension, some or all of the following information may be required, in accordance with one or more implementations: (1) source tags used to identify the nodes for which the extension is created; (2) extension tags that are used to identify the extensions to be created; and/or (3) define I/O point distribution to define the space/extension where the node can receive incoming connections, and define the space where the nodes can have outgoing connections.

For incoming extensions, the distribution of receiving terminals may be specified. The distribution of receiving terminals may be analogous to dendritic spread, and/or distribution of synaptic boutons in case of a neuron. For an outgoing extension, the projection spread may be specified. The projection spread may be analogous to axon terminals.

For the distribution of receiving terminals and spread of projections, HLND may support predefined functions (e.g., bounded Gaussian and/or uniform distribution). In general, arbitrary density functions may be used.

Exemplary HLND calls are shown in the Listing 2 below:

Listing 2.

example1_exc_neurons_axon = ('example1_exc_neurons', pdf1)
example2_exc_neurons_dendrite = ('example2_exc_neurons', pdf2)

In another approach, connections are instantiated without the use of morphology/extension.

Connecting Nodes

The HLND connection statement may comprise instructions configured to instantiate connections (of a given connection type) from one set of nodes to another set of nodes. In some implementations, some or all of the following information may be required in order to enable these node-to-node connections: (1) "from subset", (2) "to subset", and/or (3) "connection type". A from subset may include a node subset selected by tags that uniquely identify source nodes/extensions (e.g., nodes/extensions that a connection will originate from). A to subset may include a node subset selected by tags that uniquely identify destination nodes/extensions (e.g., nodes/extensions that a connection will terminate at). A connection type may include the connection type used to connect <From Subset> nodes/extensions to <To Subset> nodes/extensions.

In some implementations, the HLND connection statement may direct connection instantiation with a given connection type from all available <From Tags> nodes to all available <To Tags> nodes. According to some implementations, the connection parameters may be used to filter out connections. That is, filter constrains may be applied to the some or all possible <From Tags> to <To Tags> connections. Therefore, a subset of possible <From Tags> to <To Tags> connections may be instantiated, which may allow instantiation of arbitrary connection maps from <From Tags> to <To Tags>. In some implementations, connections may be expressed as function calls. In some implementations, connections may be expressed using a table. In some implementations, a connection filter may be configured to generate all-to-all connections, where all of the <From Tags> are connected to all of the <To Tags>.

As an aside, two notation formats <From Tags> and <From Subset> may be used in various implementations, as both notations may cause the HLND to generate connections for a subset. For example, notation <'FromTag1' AND 'FromTag2'> may describe a collection of nodes (e.g., Collection1) that have both tags 'FromTag1' and 'FromTag2'. Accordingly, notation: <'Collection1'> may be used instead while producing the same results.

By way of non-limiting example, the following connection statements may be employed:

```
exc2exc = (pre='example1_exc_neurons_axon',
post='example2_exc_neurons_dendrite', 100 connections / cell,
SynType='GLU', _other_parameters_).
```

In some implementations, the HLND connections statement may be configured to enable parameterized connection establishment, such that parameters may be passed to the connection type to set the connection variables in the connection instances. In some implementations, the connection parameters may be used to set the weights of the synaptic node connection. In some implementations, the node information (e.g., the position of the from-node and the to-node) may be used to set up connection weights based on the distance between the nodes.

By way of non-limiting example, one or more of the following connection statements may be employed: (1) connect each <From Nodes> node to N<To Nodes> node; (2) connect to each <To Nodes> node N<From Nodes> node; and/or (3) randomly sample N from all possible connections.

In some implementations, nodes may comprise position tags and/or may have zero default extension. Such nodes may connect to co-located nodes. Connecting nodes with spatial tags may require overlap so that overlapping nodes may be connected.

Figure 3A:
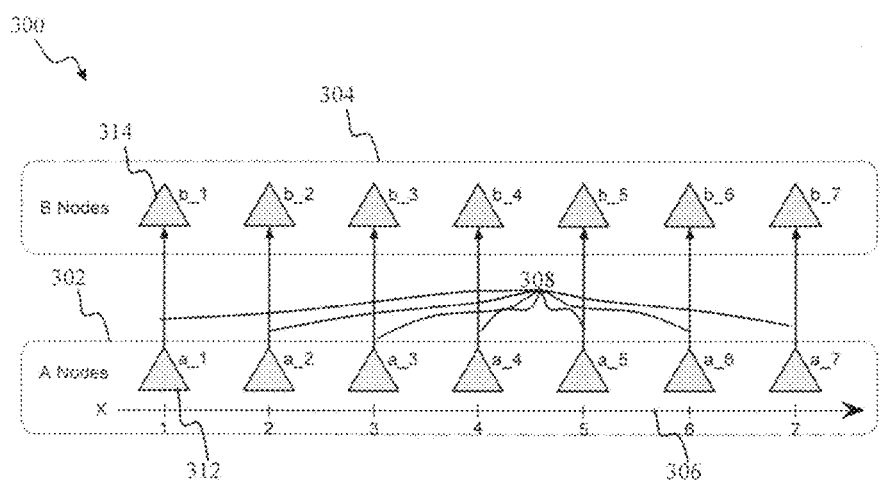
FIG. 3A is a block diagram illustrating a node interconnection, in accordance with one or more implementations.

Referring now to FIG. 3A, an exemplary implementation of an HLND framework node interconnection is shown and described in detail. The network 300 of FIG. 3A may comprise a group of A nodes 302 and a group of B nodes 304. For clarity, the network 300 may be configured using a one-dimensional configuration, so that nodes with matching X-coordinates 306 (i.e., the node index i=1:7 in FIG. 3A) are allowed to be connected via the connections 308. Specifically, a node a_i from the node group 302 may be allowed to be connected to the respective node to b_j of the node group 304 when i=j, such as, for example the nodes 312, 314, respectively, in FIG. 3A. Several possible connections are illustrated by solid lines 308.

Figure 3B:
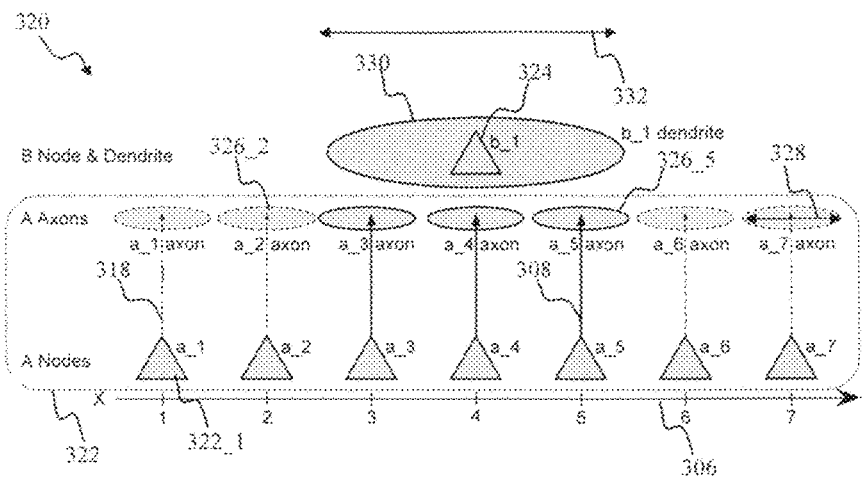
FIG. 3B is a block diagram illustrating a node interconnection comprising a uniform dendrite, in accordance with one or more implementations.
Figure 3C:
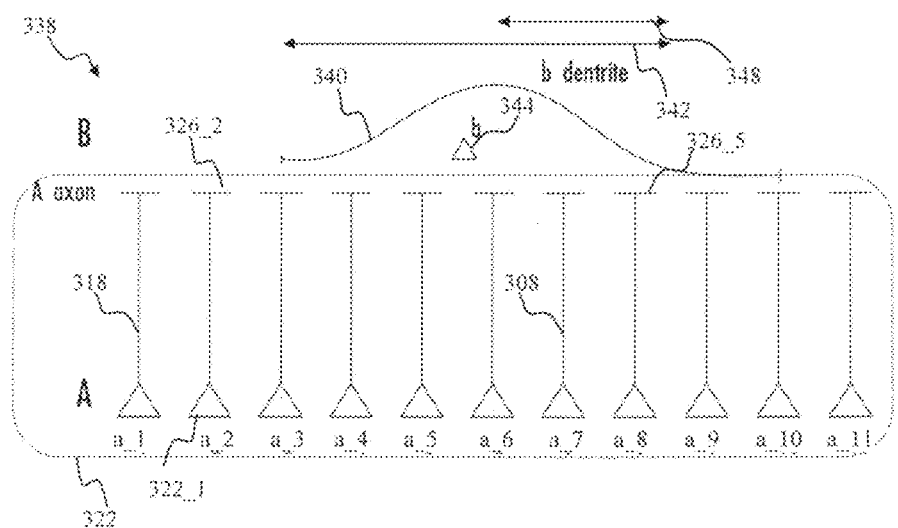
FIG. 3C is a block diagram illustrating a non-uniform node interconnection, in accordance with one or more implementations.

In some implementations, such as illustrated in FIGS. 3B-3C, node extensions may be added to the nodes of the node groups, respectively, in order to implement complex connections and to enable more flexible connection mapping. The node extensions may be used to, inter alia, map spatial coordinates of the source nodes (e.g., the nodes A of the group 322 in FIG. 3B) to the receiving nodes (e.g., the node 324 in FIG. 3B). The extensions may be used to define the probability density function of potential connections, such as in the exemplary implementation illustrated in FIG. 3C.

FIG. 3B illustrates an exemplary implementation of node to node connection configuration comprising node extensions. The network 320 of FIG. 3B may comprise the group 322 of A nodes a_1:a_7 and single B node 324. The network 320 of FIG. 3B may be configured using a single dimension so that the nodes with matching X-coordinates 306 may form a connection. The B node 324 of FIG. 3B may comprise a uniform Dendrite extension 330 of the dimension 332. Individual nodes of the A node group 322 (such as the node 322_1) may comprise a uniform Axon extension 326 of the dimension 328. The axon dimension 328 may be smaller than the dendrite dimension 332. The term "uniform extension" may be used to describe the uniform probability distribution of connections for overlapping extensions (Axon or Dendrite in this example). That is, node connections may be equally likely provided their extensions overlap, according to some implementations. For a one dimensional extension (e.g., the extension 330 in FIG. 3B), this may correspond to a uniform connection probability along the extent 332 of the extension 330. For a multi-dimensional extension, the uniform extension may correspond to a uniform connection probability in all dimensions.

The network configuration illustrated in FIG. 3B may allow connections between the node a_i of the A group 322 to the b_1 node 324 when the axons 326_i overlap with the spatial dimension 332 of the dendrite 330. As illustrated in FIG. 3B, the nodes a_3, a_4, a_5 may be connected to the node b_1 via the connections, depicted by solid arrows 308 in FIG. 3B. Inactive (e.g., not allowed) connections 318 between other A nodes are depicted by dashed arrows in FIG. 3B. The tags <'axon'> and <'dendrite'> may refer to another 'view' of the node.

As illustrated in FIG. 3B, the following extension may be constructed: (i) a uniform circle extension (denoted as the Dendrite) to the B node 330 in FIG. 3B; (ii) a uniform circle extension (denoted as the Axon) to all A nodes in FIG. 3B; and/or (iii) Connect <A Axon> to <B Dendrite>. The A to B node connection may be possible and may be instantiated because both the sending and receiving extensions may be uniform. In this example, the connect statement is looking for extension overlaps—that is, whether the <Axon> extension of a node <A> overlaps with the <Dendrite> extension of a node <B>.

Within the HLND framework, nodes may comprise different views, such as, for example, Axons or Dendrites. Node tags 'axon' or 'dendrite' may be used in HLND to refer to the same node. The Axon/Dendrite may have different spatial properties.

FIG. 3C illustrates an exemplary implementation of node-to-node connection configuration comprising non-uniform node extensions. The network 338 depicted in FIG. 3C may comprise the group 322 of A nodes and the B node 344. Individual ones of the A nodes may comprise a uniform extension 326. The B node 344 may comprise a non-uniform extension 340. The term non-uniform extension may be used to describe the node extension (Axon or Dendrite) that has a non-uniform connection probability distribution across at least one dimension of the extension. For a one dimensional extension (e.g., the extension 340 in FIG. 3C), this corresponds to a non-uniform extension connection probability distribution along the extension extent 342. In some implementations, the extension connectivity parameter P may comprise a connection likelihood, which may be characterized by a probability function as a function of the extension extent 342.

The connectivity profile of the non-uniform extension 340 (see FIG. 3C) may be configured using a shape of the Gaussian distribution and/or other distributions. The extension 340 may be centered at the node 344. The extension 340 may be characterized by a certain variance $\sigma^2$ and a radius 348.

Node connections via non-uniform extension are illustrated in FIG. 3C. The network configuration illustrated in FIG. 3C may allow connections between the node a_i of the A group 322 to the b node 344 when the axons 326_i overlap with the spatial dimension 342 of the non-uniform dendrite 340. Possible connections in the network 338 include a_3, a_4, . . . , a_10 axon to b dendrite, as a_1 axon, a_2 axon, and a_11 axon do not overlap with the dendrite 340 spatial dimension 342.

The non-uniform extensions (e.g., the extension 340 in FIG. 3C) may bias the selection of connections towards axons that overlap with the highest probability area of the non-uniform dendrite. While the extension dimension overlap may be used to identify all of the possible connections, the sampling of the possible connections may follow the connectivity profile (probability) of the extensions. When selecting a subset of the possible connections the connectivity profile (shape) of the extension (that describes connection likelihood) may need to be taken into account. By way of non-limiting example, when connecting a single arbitrary <A axon> 326 to the <b dendrite> 340 (see FIG. 3C), the most likely outcome may be a connection between the node a_6 and the node 344, rather than connections between nodes a_1, a_10 to the node 344.

In some implementations, the HLND exemplary operation sequence for connecting node populations using non-uniform extension may be: (1) add Gaussian extensions centered at the node with a fixed radius r1 to B nodes and tag these extensions as <Dendrite>; (2) add uniform extensions with a fixed radius $r_2$ to A-nodes and tag these extension as <Axon>; and (3) connect N random <A Axon>s to <B Dendrite>s. The possible connections may be where the <Axon> extensions of <A> nodes overlap with the <Dendrite> extensions of <B> nodes. Instantiated connections may correspond to the highest connectivity. In some implementations, the highest connectivity may be determined based on a product of the Gaussian and the uniform functions.

I/O for Network Objects

In some implementations of the HLND framework, network objects may comprise one or more members and an Input/output (I/O) interface. The I/O interface may specify how to interface (e.g., establish connections) with other elements of the network. In some implementations, the members of the network object may comprise nodes. In some implementations, the members of the network object may comprise nodes and connections. The I/O interface may define how the object members are accessible from outside the scope of the network object. During definition, individual members of the network object (and their values) may be declared as public or private. Private members may not be visible (i.e., directly not accessible) to external network elements outside the network object. The private object members may be accessible via the I/O interface defined for that member. That is, private members of a network object may not be visible from outside the scope of the network object. In this case, the I/O interface may be required to implement connections.

In some implementations, the network objects may be defined as 'open'. Members of a network object defined as open may be public and visible from outside the scope of that network object. This may alleviate a requirement to publish the I/O interface.

Public members of the network object may be visible and/or accessible by external elements for input and/or output connections. In some implementations, members of the network objects may be scoped by default. That is, some or all variables within the network object may be scoped inside the network object. Members of multiple instances of the same network object type may not interfere when these members use the same tags.

In some implementations, a network object may be defined as a 'macro'. A network object defined as a macro may not be treated as scoped object. Such macro definition may allow some or all of the variables defined within the macro object to be accessible and/or visible by external elements.

By way of non-limiting example, node_a may be a public member of network object NO1, node_b (that is not a member of NO1) may connect directly to the node_a, and/or receive connections from the node_b. A member node_a in NO1 may be accessed by using the tags <NO2> and <node_a>, and/or with NO1 mode_a scoped notation. A node_c that is a private member of network object NO2 may not be visible and/or accessible from outside unless the I/O interface is defined for the node_c member of the NO2, according to some implementations. An external node (that is not member of the NO2) may not connect to and/or receive a connection from the node_a member directly. In other words, a public member of a network object may be accessed using tags and/or other publicly available information.

Figure 4:
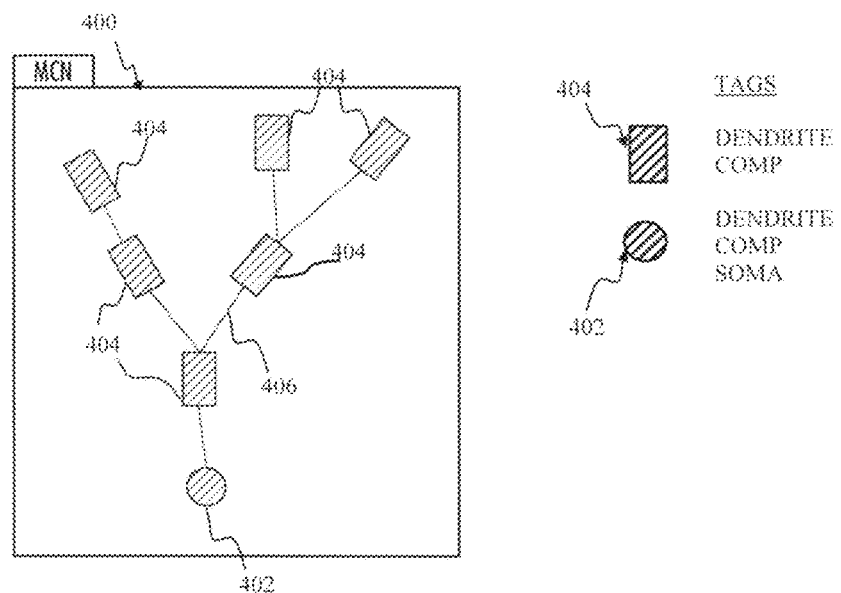
FIG. 4 is a block diagram illustrating a public multi-compartment neuron (MCN), in accordance with one or more implementations.

An exemplary implementation of the HLND network object, illustrating a public multi-compartment neuron (MCN), is shown and described in connection with FIG. 4. The MCN neuron 400 may comprise one or more public nodes, which may include dendritic compartments 404 and soma compartment 402. The term public may refer to members of the network object (e.g., the compartments 402, 404) that are visible outside the scope of their definitions (e.g., outside the MCN 400). Individual compartments 404 may be assigned two tags, which may include DENDRITE, COMP, and/or other tags. Compartment 402 may be assigned three tags, which may include DENDRITE, COMP, SOMA, and/or other tags. The compartment 402 and individual compartments 404 may be connected via junction connections 406.

By way of non-limiting example to illustrate functionality of public network elements in accordance with some implementations, two instances of public MCN neuron 400 may be considered. One instance may be tagged as the 'neuron_a', and another instance may be tagged as the 'neuron_b'. The notation <neuron_a AND soma> collection may refer to the member 402 of MCN with the SOMA Tag in the neuron_a instance. The <neuron_b AND SOMA> collection may refer to the member 402 of MCN with the SOMA Tag in the neuron_b instance. As some or all members 402, 404 of the MCN <neuron_a> may be public, they may be visible to outside entities (e.g., the MCN <neuron_b>), which may enable direct connection of the <neuron_a AND SOMA> to the <neuron_b AND DENDRITE AND COMP>.

In some implementations, connections from <neuron_a AND SOMA> to <neuron_b AND SOMA> may be instantiated using a given connection type.

As will be appreciated by those skilled in the arts, the above notation is exemplary and various other notations may be used in order to identify, select, and/or access node members using their tags.

Figure 5:
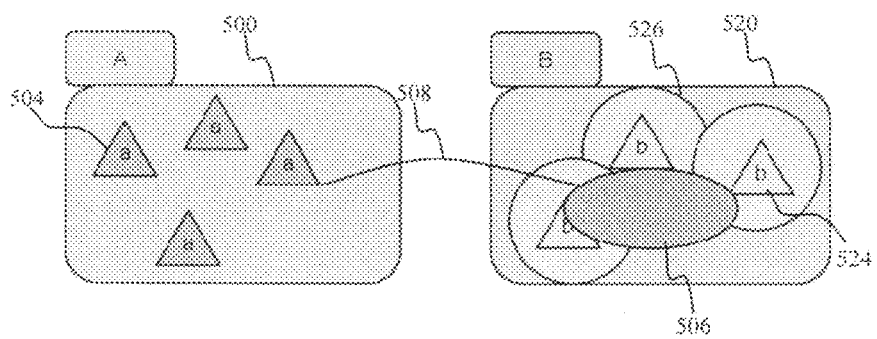
FIG. 5 is an exemplary pseudo code illustrating a public node declaration, in accordance with one or more implementations.

FIG. 5 illustrates connection instantiation between public neurons A and B (denoted by the designators 500 and 520 in FIG. 5, respectively), in accordance with one or more implementations. Individual members 504 of the node A and individual members b 524 of the node B may be public. Individual 'a' members 504 may be connected to individual 'b' members 524. An example is illustrated in FIG. 5 where the out projection 508 may overlap with multiple in projections 526 of the nodes 524, so that the connection 508 may be established between the single a node 504 and one or more b-nodes 524.

Figure 6:
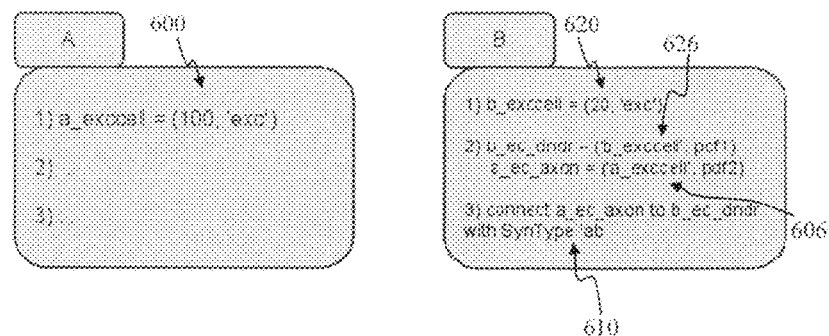
FIG. 6 is a block diagram illustrating a public node interconnection using public node definitions, in accordance with one or more implementations.

An exemplary pseudo-code, corresponding to the implementation illustrated in FIG. 5, is presented in FIG. 6. The statements 600 and 620 in FIG. 6 may be configured to generate the node instances 504 and 524 of FIG. 5, respectively. The statements 606 and 626 in FIG. 6 may be configured to define the out projections 506 and/or the in projections 526 of FIG. 5, respectively. The last statement 610 may be configured to define the connection 508.

Figure 7:
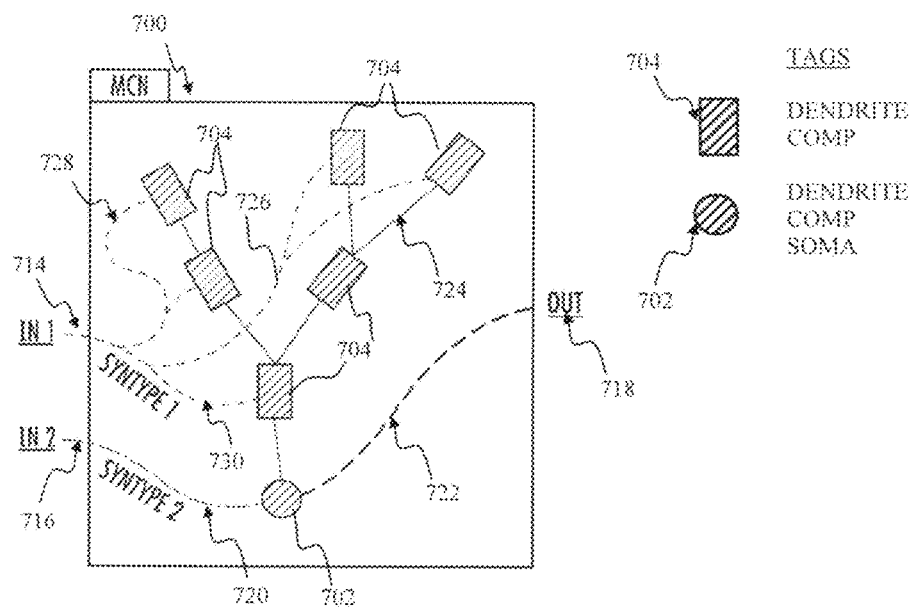
FIG. 7 is a block diagram illustrating a private MCN comprising two input interfaces and a single output interface, in accordance with one or more implementations.

FIG. 7 illustrates an exemplary implementation of a network object comprising a private multi-compartment neuron. The private MCN neuron 700 may comprise one or more private compartments 704 and/or a private compartment 702. The term 'private' may refer to network members (e.g., the compartments 702 and 704) that are not visible outside the definition scope of the respective network object (e.g., outside the MCN 700). Individual compartments 704 may be assigned two tags, which may include DENDRITE, COMP, and/or other tags. The compartment 702 may be assigned three tags, which may include DENDRITE, COMP, SOMA, and/or other tags.

By way of non-limiting illustration, two instances of the private MCN 700 type may be considered. One instance may be tagged as "neuron_a", and another instance may be tagged as "neuron_b". As the MCN 700 type is defined as private, the MCN 700 members (e.g., the <neuron_a AND DENDRITE & COMP>, <neuron_a AND SOMA>, <neuron_b & DENDRITE & COMP>, <neuron_b & SOMA>, <SOMA> collections) may be invisible from outside the MCN 700. Directly connecting the <neuron_a AND SOMA> to the <neuron_b AND DENDRITE AND COMP> may not be permitted for the node configuration type illustrated in FIG. 7, in accordance with some implementations. In order to enable neuron external connectivity, the MCN 700 definition may comprise input ports 714 and 716, and the output 718 port, may be used to specify the I/O interface for the MCN node type. The input interface of the MCN 700 may comprise direct internal connections to the private members of the MCN 700. Direct internal connections to the private members of the MCN 700 may include the connections 726, 728, and 730 from the input interface IN1 714 to the private members 704 with tags "DENDRITE" and "COMP". Direct internal connections to the private members of the MCN 700 may include the connection 720 from the input interface IN2 716 to the private member 702 with the tag "SOMA". The link 722 may connect the private member 702 to the Output interface 718, which may allow the node 702 to be used for outgoing connections and/or for incoming connections. The neuron_a.OUT may be configured to be linked/connected to the neuron_b.IN1. The neuron_b.OUT may be configured to be linked/connected to the neuron_a.IN2.

Figure 8A:
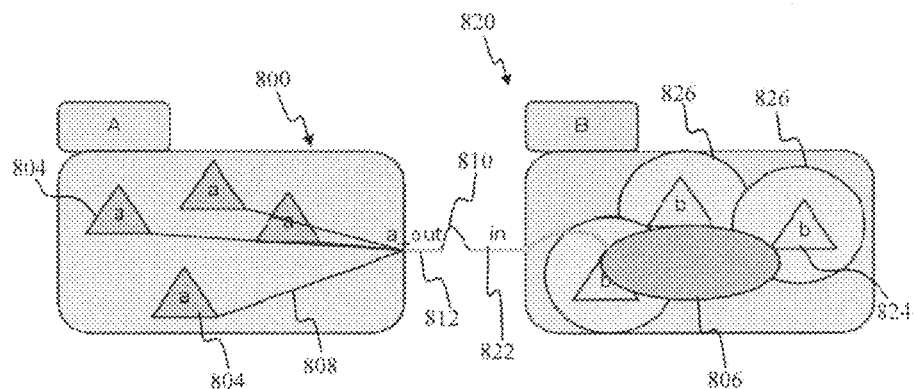
FIG. 8 is a block diagram illustrating a private neuron interconnects, in accordance with one or more implementations.

FIG. 8 illustrates an exemplary connection instantiation between private network objects A and B (denoted by the designators 800 and 820 in FIG. 8A, respectively). Individual ones of the members 804 of the node A and/or individual ones of the members 824 of the node B may be private and, hence, may be inaccessible by outside instances. That is, the 'a' node members 804 may be inaccessible by the 'b' node members 824 and vice versa, according to various implementations. In order to enable the node instances 800 to generate external connections to nodes 820, I/O interfaces for the private node members may be required. In some implementations, the I/O interfaces may comprise input/output ports (e.g., the I/O ports 714, 716, and 718, described with respect to FIG. 7, supra). A private node instance (e.g., the instance 800) may comprise a large number (e.g., millions) of other private members. A private node instance may provide an outgoing interface 812 for those members that will be used for outgoing connections.

Conversely, while individual ones of the members 824 of the node instance 820 may be kept private, an input interface 822 may be used to specify how the node members 824 connect to the input port 822, according to some implementations. Although a single port is illustrated in the implementation of FIG. 8A, this is not intended to be limiting as multiple uniquely tagged input/output ports may be used in some implementations.

As the output interface 812 of the node instance 800 and the input interface 822 of the node instance 820 may be exposed and/or visible to external network elements, a link/connection 810 may be established between the node instances of network objects 800 and 820 by using in and out interfaces 812 and 822, in a manner that is similar to the connection establishment described with respect to FIG. 5, FIG. 7, supra.

Figure 8B:
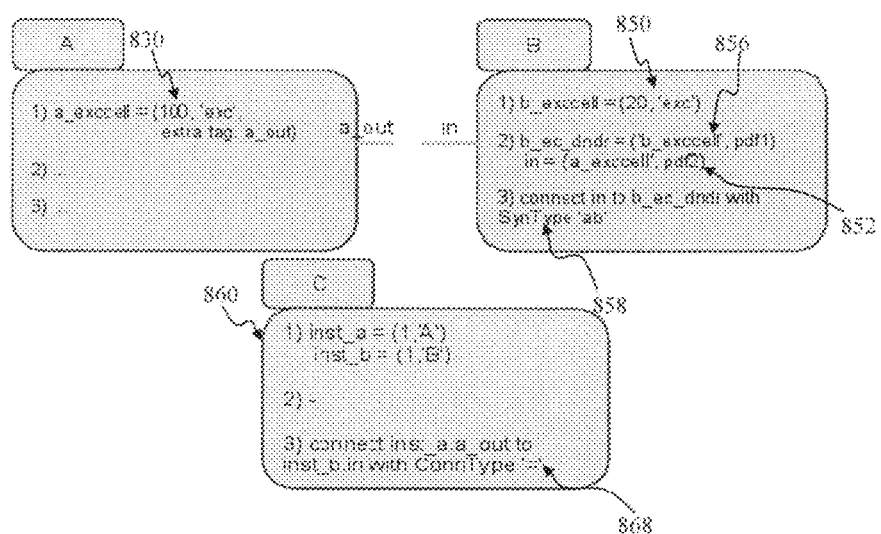

FIG. 8B presents an exemplary pseudo-code, corresponding to the connection establishment implementation illustrated in FIG. 8A. The statement 830 in FIG. 8B may create the node instances 804 in FIG. 8A and may expose the output port 812. The statement 850 in FIG. 8B may create the node instances 824 in FIG. 8A. Statements 856 and 852 in FIG. 8B may define the in projections 826 of 'b' nodes 824 of FIG. 8A and/or the in interface 822 of FIG. 8A, respectively. The statement 858 may define the connection between input interface and 'b' members.

In some implementations, a third network object 860 may create the instances inst_a and inst_b of types A 800 and B 820, respectively, and/or may connect the inst_a instance to the inst_b instance using the a_out port of the node instance 800 and the in port of the node instance 820. The exemplary HLND definition steps, shown in FIG. 8B, may include (1) creating an instance of A (inst_a), (2) creating an instance of B (inst_b), and/or connecting and/or linging inst_a to inst_b.

As the members of the node instances A and B may be private, the object C may not directly connect the members of the instance A to the members of the instance B. Instead, the object C may use the exposed ports inst_a.a_out to the inst_b.in. In the connection, declaration 868 may use the equal sign notation to denote that the inst_b.in is assigned to (e.g., is the same as) the inst_a.a_out. In some implementations, the HLND compiler may use the definition 868 and a definition of the private node B members to resolve the connection between the virtual b.in port to the actual members of the node B 820 by linking the inst_b.in with the corresponding member(s) of the node instance A 800—that is, indirectly establishing the connection between the inst_a (of A) and the inst_b (of B). As illustrated in FIG. 8A, the node type 800 and 820 may specify projection extensions and/or synapse/connection types that may e required to effect the node to node connection.

Tags

In accordance with some implementations, individual elements of the network (i.e., nodes, extensions, connections, I/O ports) may be assigned at least one unique tag to facilitate the HLND operation and disambiguation. The tags may be used to identify and/or refer to the respective network elements (e.g., a subset of nodes of the network that is within a specified area).

In some implementations, tags may be used to form a dynamic grouping of the nodes so that these dynamically created node groups may be connected with one another. That is, a node group tag may be used to identify a subset of nodes and/or to create new connections within the network, as described in detail below in connection with FIG. 9. These additional tags may not create new instances of network elements, but may add tags to existing instances so that the additional tags are used to identify the tagged instances.

Figure 9:
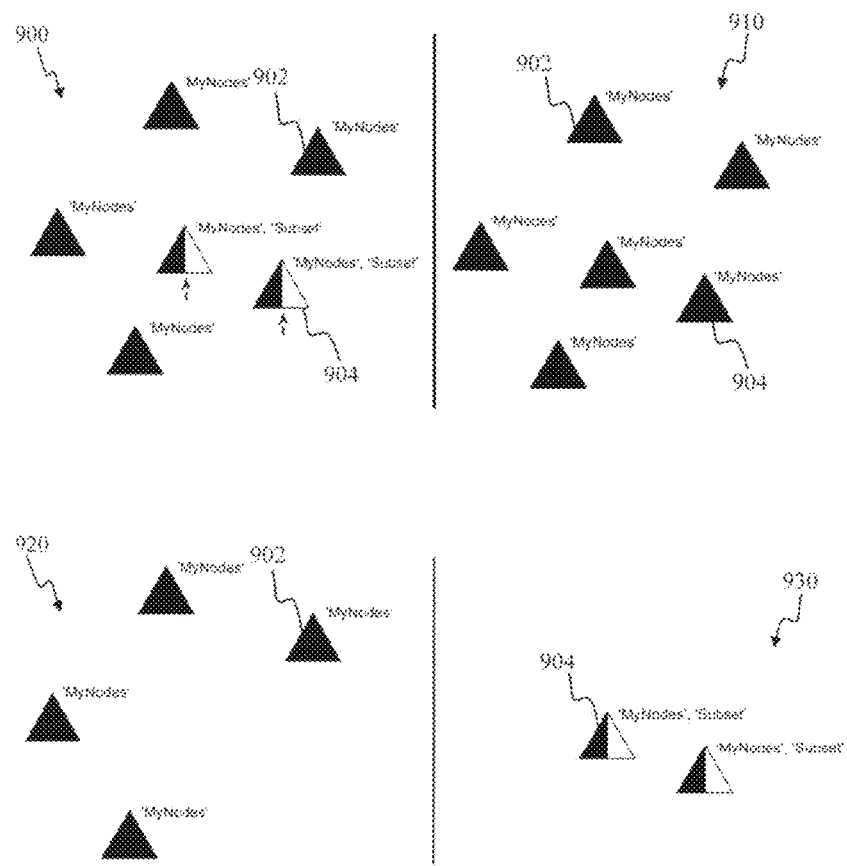
FIG. 9 is a graphic illustrating a node subset tagging, in accordance with one or more implementations.

FIG. 9 illustrates an exemplary implementation of using additional tags to identify tagged instances. The network node population 900 may comprise one or more nodes 902 (tagged as 'MyNodes'), one or more nodes 904 (tagged as 'MyNodes' and 'Subset'), and/or other nodes. The dark triangles in the node population 900 of FIG. 9 may denote the nodes 902 tagged as 'MyNodes', while the black and white triangles may correspond to a subset of nodes 904 that are tagged as 'MyNodes', and 'Subset'.

Using the tag 'MyNodes', a node collection 910 may be selected. The node collection 910 may comprise individual ones of nodes 902 and/or 904 (see, e.g., FIG. 9). The node collection 920 may represent nodes tagged as <'MyNodes' NOT 'Subset'>. The node collection 920 may comprise individual ones of the nodes 902. The node collection 930 may represent the nodes tagged as 'Subset'. The node collection 930 may comprise individual ones of the nodes 904 (see, e.g., FIG. 9).

In some implementations, the HLND framework may use two types of tags, which may include string tags, numeric tags, and/or other tags. In some implementations, the nodes may comprise arbitrary user-defined tags. Numeric tags may include numeric identifier (ID) tags, spatial tags, and/or other tags.

Upon instantiating a node, the instantiated node may have a string tag (the node type) and a unique numerical tag (the unique numerical identifier). In some implementations, position tags may be assigned during the instantiation process.

Operations on Tags

As shown in FIG. 9B, the tags may be used to identify a subset of the network. To implement this functionality, one or more Boolean operations may be used on tags. In some implementations, mathematical logical operations may be used with numerical tags. The < . . . > notation may identify a subset of the network, where the string encapsulated by the chevrons < > may define operations configured to identify and/or select the subset. By way of non-limiting illustration, <'MyTag'> may select individual nodes from the network that have the tag 'MyTag'; <'MyTag1' AND 'MyTag2'> may select individual members from the network that have both the 'MyTag1' and the 'MyTag2' string tags; <'MyTag1' OR 'MyTag2'> may select individual members from the network that has the 'MyTag1' or the 'MyTag2' string tags; <'MyTag1' NOT 'MyTag2'> may select individual members from the network that have the string tag 'MyTag1' but do not have the string tag 'MyTag2'; and <'MyTag1' AND MyMathFunction(Spatial Tags)<NumericalValue1> may select individual nodes from the network that have the string tag 'MyTag1' and the output provided by MyMathFunction (as applied the spatial coordinates of the node) is smaller than NumericalValue1. Note that this example assumes the existence of spatial tags, which are not mandatory, in accordance with various implementations.

Tag Inheritance

In some implementations, the HLND framework may comprise hierarchical tag inheritance. In some implementations, individual members that are instantiated within a network object may inherit string tags of its parent. For example, individual members of a network object with tags 'ParentTag1' and 'ParentTag2' may comprise the tags 'ParentTag1' and 'ParentTag2' in addition to the member-specific tags assigned, for example, during member instantiation.

In some implementations, member spatial tag data may refer to local coordinates (referenced relative to the space defined by the network object) of the member. In some implementations, global coordinates (referenced relative to the space of the entire network) may be inferred from the nested structure of network objects and/or members.

Figure 10:
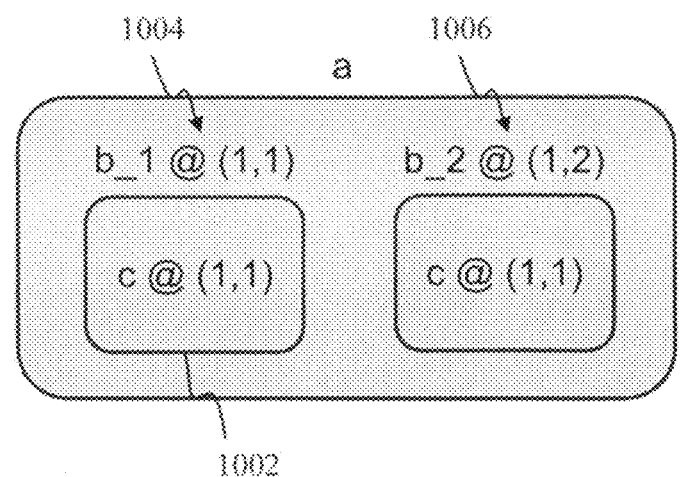
FIG. 10 is a block diagram illustrating spatial tag inheritance, in accordance with one or more implementations.

FIG. 10 illustrates an exemplary implementation of spatial tag inheritance. A network object B (not shown) may instantiate a single instance of the node of type C, e.g., the node_c at position (1,1), denoted as 1002 in FIG. 10. A network object A (not shown) may instantiate two instances of the node type B, e.g., the node_b_1 at position (1,1) and the node_b_2 at position (1,2), denoted as 1004 and 1006, respectively, in FIG. 10. The coordinates of the node_c may be referenced to the scope of the node_b_1. The coordinates of the node_b_2 may be set to (1,1). The coordinates of the node_b_1 and the node_b_2 referenced to the scope of the node_a may be set as (1,1) and (1,2), respectively. The coordinates of the node_c in the node_b_1 referenced to scope of the node_a may be determined as (1,1)+(1,1)=(2,2). The coordinate of the node_c in the node_b_2 referenced to the scope of the node_a may be determined as (1,2)+(1,1)=(2,3). Note that the notation node_c, node_b_1, node_b_2 and node_a may be used to identify the instantiated objects of type C, B, and A, respectively.

HLND tag properties and/or characteristics, according to one or more implementations, may be summarized as: tag types may include string tags and numerical tags; numerical tags may comprise the numerical identifier; Boolean operations may be used on tags; math functions may be allowed on numerical tags; optional spatial and string tags may be assigned; individual node instances may comprise a unique numerical identifier tag; string tag inheritance may be hierarchical; spatial tags may refer to local coordinates; global tag coordinates may be inferred from the nested structure of nodes; and/or other properties and/or characteristics.

Tag Implementation

In some implementations, the HLND framework implementation of tags may be configured to require the following functionality: (i) an interface to tag-data generator and data handler; and (ii) implementation of nested objects so as to enable creation of complex network objects from any number of existing network objects.

In some implementations, the tag data handler may be implemented using a database, such as, e.g., MySQL. Instances of network objects may be generated using arbitrary string tags. In some implementations, the network objects may be generated using position tags as well as the string tags. Tag data may be placed into a database. Additional network data (e.g., instances of connections, such as junctions, synapses, etc.) may be generated. The instantiation of connections may depend on position tags and/or query results. The new data may be stored in the database.

Tag implementation configuration may enable partitioning of the network software application into two parts, which may include a data generation block, a data storage block, and/or other parts. The data generation block (e.g., implemented in c++) may be configured to generate data based on its own 'intelligence' and/or by interacting with the database (e.g., MySQL). In some implementations, the data generator functionality may be embedded within the database server. The data generator may be implemented using server side procedures activated by triggers. Such triggers may include insert and connect call/trigger procedures stored on the database server.

In some implementations, instantiating an END synapse/junction may require information such as one or more of class and ID of pre-synaptic unit1; class and id of post-synaptic unit2; spatial position of pre/unit1 and post/unit2, and spatial projection of pre/unit1.out and post/unit2.in.; and/or other information.

A synapse/junction instance may be generated. In some implementations, additional external parameters may be used for instantiation of an END synapse/junction. Examples of the external parameters may include synaptic weights, synaptic delays, and/or other external parameters. The use and functionality of synaptic weights and/or delays in node-to-node connections is described in further detail in a co-owned U.S. patent application Ser. No. 13/152,105, filed on Jun. 2, 2011, entitled "APPARATUS AND METHODS FOR TEMPORALLY PROXIMATE OBJECT RECOGNITION" and/or in a co-owned U.S. patent application Ser. No. 13/152,084, filed on Jun. 2, 2011, entitled "APPARATUS AND METHODS FOR PULSE-CODE INVARIANT OBJECT RECOGNITION", each of the foregoing incorporated herein by reference in its entirety.

To connect different network objects that use different spatial coordinates, the coordinate system used for each network object may be published. That is, the coordinate system configuration may be available to individual nodes within a certain scope.

Within the HLND framework, connections between network objects may be established in one or more ways. In some implementations, the connection may be established based on an overlap between the axon terminal distribution and the synaptic bouton distribution. In some implementations, the overall connection map may be obtained using a joint probability distribution function (PDF) of the axon terminal distribution and the synaptic bouton distributions. The joint PDF may be used to establish the required connections (synapses). In some implementations, the HLND framework may be configured to distribute individual ones of the potential connection points. Connection points may be subject to one or more particular condition, such as, spatial coordinate and/or other conditions. The HLND connection algorithm may be configured to select all (or a subset) of these connection points. The HLND connection algorithm may be configured to instantiate the corresponding connections. In some implementations, the HLND may be configured to generate arbitrary user-defined connection sets. According to some implementations, the HLND may be configured to generate all-to-all connections.

SQL-Like Format

In some implementations, the HLND may implemented entirely using SQL. According to some implementations, such SQL implementation may be effected using MySQL database and stored functions/procedures. The HLND statements may be constructed according to the English language grammar.

Tag Examples

As described above, individual network elements defined within the HLND, regardless whether it is a node, unit, synapse, or junction, or just an empty placeholder, may comprise a tag. This property of the HLND network description may allow tagged elements to, inter alia, be addressed and manipulated as a group. In some implementations, spatial coordinates may be implemented using tags in the form (x,y,z).

By way of non-limiting example, a network unit may comprise one or more tags including the unit ID numerical identifier, 'QIF', 'soma', 'pyramidal', 'layer2/3', 'V1', spatial coordinates tag (0.1,0.3,0.5), and/or other tags. A synapse may have tags such as, UD, pre_neuron, post_neuron, and/or other tags, denoting a pre-synaptic and a post-synaptic node IDs, respectively, 'apical', 'exc', 'glu', and a spatial coordinates tag (0.1,0.3,0.4).

Tagged Operator and Tag Filters

In some implementations, storing tags in a database may allow fast access to groups of elements. Individual database query statements that operate on tags may act as a tag filter (or a search statement) that selects particular elements (that match the query terms) from the database. For example, specifying <'V1'> in the query, may result in a selection of individual elements that comprise 'V1' in any of its tags, e.g., the entire V1 subset. Specifying (<'V1' AND 'pyramidal' AND NOT 'layer2/3') may result in individual pyramidal cells in V1 that are not located in the network layers 2 and 3.

In some implementations, an output of a tag query may be assigned its own tag as follows:

| Listing. 3 |
|---|
| <tag filter> TAGGED new_tag |

Some implementations may allow addressing of the elements that satisfy the tag filter, without copying and pasting the filter statement.

Example 3

The following statement:

exc OR inh TAGGED all may add tag 'all' to all 'exc' and 'inh' neurons for easy reference.

Example 4

The following statement:

(exc AND id<400) OR (inh AND id<100) TAGGED first_half may cuts the network in half by assigning an extra tag to the first half of elements.

OF Operator and Subsets

In some implementations, the expression

| Listing. 4 |
|---|
| n OF <tag filter> | may return a list of n random elements satisfying the tag filter condition. If the tag filter returns fewer than n elements, then some elements may be duplicated, so that the total number of elements returned by the expression of Listing 5 is equal to n. The OF operator may not assign new tags. The OF operator may select a subset of elements. To assign tags to the elements of the subset, the TAGGED operator may be used. The expression Listing 5.

```
100 OF cones TAGGED S_cones
``` may select 100 elements from the node population of cones and may tag individual selected elements as the S_cones. Similarly, the expressions Listing 6.

```
300 OF (cones AND NOT S_cones) TAGGED M_cones
cones AND NOT M_cones AND NOT S_cones TAGGED L_cones
``` may select 300 elements from the node population of cones (that are not in the subset S_cones), may tag individual selected elements as the M_cones, may select individual remaining elements from the node population of cones (that are not in either subset of S_cones or M_cones), and may tag each selected element as the L_cones.

Example 6

According to some implementations, a network comprising 800 excitory (exc) and 200 inhibitory (inh) neurons may be split into two equal sub-networks, subnetwork1 and subnetwork2, each comprising 400 exc and 100 inh randomly selected neurons, as follows:

Listing 7.

```
400 OF exc TAGGED subnetwork1
100 OF inh TAGGED subnetwork1
400 OF (exc AND NOT subnetwork1) TAGGED subnetwork2
100 OF (inh AND NOT subnetwork1) TAGGED subnetwork2
```

Contrast the implementation of Listing 7 with the following statements:

Listing 8.

```
500 OF (exc OR inh) TAGGED subnetwork1
500 OF (exc OR inh) TAGGED subnetwork2.
```

The statements of Listing 8 do not guarantee that the each of subnetwork1 and subnetwork2 comprises exactly 400 excitatory and 100 inhibitory neurons.

PUT Operator and Instantiation of Units

This PUT operator may be used to instantiate and tag network units as follows:

Listing 9.

```
PUT n OF unit_class
```

The PUT operator may be an instruction to create n instances of the 'unit_class' type and tag them as (id, unit_class). Additional tags may be subsequently added to these units by using TAGGED operator. The PUT operator may make calls to the respective constructor function of the unit_class to instantiate individual units. In the Listing 10, the OF keyword may be used to cause generation of n copies of the unit_class by calling the unit_class constructor n times.

Example 8

In accordance with some implementations, the statement

Listing 10.

```
PUT 800 OF exc
``` may create 800 units of exc class, with individual instances being tagged as (id, exc).
The following statement Listing 11.

```
PUT 800 OF exc TAGGED exc_neurons
``` creates 800 units of exc class, with individual instances being tagged as (i) (id, exc); and/or (ii) additional tag exc_neurons, so that individual instances comprise two tags.

In some implementations, the PUT operator may be used to create unit instances by using a filter parameter as follows:

Listing 12.

```
PUT <tag filter> OF unit_class
```

The instruction of Listing 12 may be configured to create the number of instances of the unit_class corresponding to the number of elements that are selected by the <tag filter> query field. Individual instantiated units in Listing 12 may be tagged with a tag corresponding to the respective element in the unit list that is selected by the query. When the construction function, unit_class, is called, it may have access to tags of the element that it instantiates (e.g., to the IDs, coordinates, etc.) so that constructor has sufficient information for unit construction.

Example 9

The statement

Listing 13.

```
800 ON circle(1) TAGGED my_points // see below the definition of ON
PUT my_points OF exc
``` may be configured to instantiate and distribute 800 units of exc class on a unit circle. The same outcome may be achieved by using the composite statement PUT 800 OF exc ON circle(1).

CONNECT Operator and Connecting Units

The connect operator may be used to a synapse connection as:

Listing 14.

```
CONNECT pre_tag TO post_tag WITH synapse_class
``` where the parameter synapse_class denotes the class definition for the synaptic connection and pre_tag, and the post tag denotes the filter mask specifying pre-synaptic units and post-synaptic units connected by the synapses. In some implementations, multiple pre-synaptic and/or post-synaptic units may be selected by the filter mask thereby resulting in the generation of multiple synaptic connections between the units that satisfy the filter mask.

In some implementations, the synapse_class may be replaced by the junction_class in the CONNECT statement so that the synaptic junctions may be generated. The construction function synapse_class may have access to individual tags of pre-synaptic and/or post-synaptic elements. The construction function synapse_class may determine the delay and/or other relevant parameters needed.

Example 9

Some implementations may provide for the statements:

---
Listing 15.
---
CONNECT N OF pre_tag TO post_tag WITH synapse_class
CONNECT pre_tag TO N OF post_tag WITH synapse_class
---

The first statement in Listing 15 may be configured to generate a connection matrix so that individual post_tag units are connected to N pre-synaptic units. The second statement in Listing 15 may be configured to generate N outgoing synapses from individual pre_tag units to n post_tag units.

The statements in Listing 15 may use randomly selected subsets. This may be implemented by a random walk through the list of all pre_tagged units and random selection of elements of the subset.

Example 10

Some implementations may provide for the statements:

---
Listing 16.
---
n OF (CONNECT pre_tag TO post_tag WITH synapse_class)
CONNECT pre_tag TO NEAREST post_tag WITH synapse_class
CONNECT NEAREST pre_tag TO post_tag WITH synapse_class
---

The first statement in Listing 16 may be configured to instantiate synapses comprising a random subset of the fully-connected matrix of pre-to-post synapses. The term fully-connected matrix may be used to describe a network configuration where all of the pre-synaptic units are connected to all of the pus-synaptic units. Unlike the examples shown in Listing 15, the first statement in the Listing 16 does not guarantee that all pre-synaptic units or all post-synaptic units comprise the same number of synapses.

The second and/or the third statement in Listing 16 may be configured to generate synaptic connections that are based on the coordinates of pre-synaptic units and the post-synaptic. The second statement may comprise a loop configured to connect each pre-synaptic unit to the nearest post-synaptic unit that satisfies the tag mask. The third statement may loop through each post_tag and finds the nearest pre_tag.

In some implementations, the parameter NEAREST 1 OF may be used in place of the parameter NEAREST in the statements of Listing 16.

In some implementations, individual pre-synaptic units may be connected to n nearest post-synaptic units using the statement:

---
Listing 17.
---
CONNECT exc TO NEAREST n OF exc WITH glu
--- which may create 'glu'-type synapses from individual excitatory neurons (i.e., a unit tagged 'exc') to n nearest excitatory neurons, including itself (i.e., resulting in one auto-synapse).

Generalized OF Operator

In some implementations, a generalized form of the OF selection operator may be configured as:

---
Listing 18.
---
<tag filter 1> OF <tag filter 2>
---

The generalized OF operator may perform one or more of (i) creating a list_1 of all n elements that satisfy the tag filter 1 condition; (ii) creating a list_2 of all m elements that satisfy the tag filter 2 condition; (iii) creating a list_3 by selecting (at random) a subset of n elements from the list_2, if n>m then n-m elements are repeated in the list_3; (iv) returning a merged list where each element from the list_1 has an additional tag from the matching element in the list_3; and/or other actions. If the list_1 and the list_3 both comprise coordinate tags, then individual elements in the merged list may comprise a coordinate tag that is the sum of the coordinates of the corresponding elements, so that a single coordinate (x,y,z) tag per element may be maintained.

Example 11

In some implementations, a set of units may be tagged with 'cones'. A set of random coordinates may be tagged with 'retina'. Random retinal coordinates may be assigned to the cones using the expression:
    cones OF retina
When the number of cones is greater than the number of coordinates, then multiple cones may be assigned the same coordinates.

ON Operator and Assignment of Coordinates

The ON operator may be used to return a sample of n points from a probability density function defined by the parameter pdf as:
    n ON pdf, Example 12

Some implementations may provide for the statements:

---
Listing 19.
---
1000 ON segment(0,1) TAGGED rnd
1000 ON circle(1) TAGGED cones
---

The first statement in Listing 19 may be configured to generate a list of elements tagged 'rnd'. The elements tagged 'rnd' may be distributed uniformly within the space segment defined by the coordinate x=[0 1]. That is, elements may have tags (rnd, x) with the x-values uniformly distributed in the range [0 1]. The second statement in Listing 19 may be configured to generate a list of 1000 elements tagged as 'cones' and distributed uniformly on a unit circle.

In some implementations, the ON operator may use individual points returned by the function F:

ALL ON F

PER Operator and Combination of Tags

The operator PER may be used to iterate through a list of tags specified, e.g., by a tag filter. For individual elements of the list, the operator PER may call the statement, passing to it all the tags of the list element. The format of the PER operator may be:

statement PER tag_list

The PER operator may return a table comprising data describing generated network elements. In some implementations, the PER operator may be used to create multiple synapses per neuron. In some implementations, the PER operator may be used to create multiple neurons per location. In some implementations, the PER operator may be used to create multiple cortical columns per cortical surface.

Example 13

Some implementations provide for the statements:

Listing 20.

```
1000 ON segment PER neuron
1000 OF locations PER neuron
```

SPNET

In some implementations, which may be applicable to SPNET, the unit classes, exc and inh and the synaptic classes, glu and gaba may be defined within the SPNET definitions.

Listing 21.

```
PUT 800 OF exc
PUT 200 OF inh
CONNECT exc TO 100 OF exc OR inh WITH glu
CONNECT inh TO 100 OF exc WITH gaba
```

The first line of Listing 21 may be configured to generate 800 units of exc type. The second line of Listing 21 may be configured to generate 200 units of inh type. The third line of Listing 21 may be configured to connect individual units with tag 'exc' (note that the class type is automatically can be used as a tag) to 100 randomly selected units with tags 'exc' or 'inh' with connection type glu. The fourth line of listing 21 may be configured to connect individual units with tag 'inh' to 100 randomly selected units with tag 'exc' with connection type gaba.

Retinal Pixel to Cone Mapping

In some implementations, the HLND description may be used to describe retinal pixel-to-cone mapping. Generally speaking, the cone cells, or cones, may be or refer to photoreceptor cells in the retina of the eye that are responsible for color vision. Cone cells may be densely packed in the fovea, but gradually become sparser towards the periphery of the retina. Below several examples are provided that describe various aspects of the retinal mapping.

Listing 22.

```
// create a 100x100 square grid of pixel coordinates
square_grid(100,100) TAGGED pixels
//create pixel_units at each pixel coordinate
```

-continued

Listing 22.

```
PUT pixels OF pixel_unit
// create hexagonal grid of cone coordinates
hexagonal_grid(100,100) TAGGED cones
// mark a random subset of 10% of them as S cones
// and create appropriate S_units
SIZE(cones)*0.1 OF cones TAGGED S_cones
PUT S_cones OF S_unit
// mark a random subset of 30% of the remainder cones as M cones
SIZE(cones)*0.3 OF cones AND NOT S_cones TAGGED M_cones
PUT M_cones OF M_unit
// the remainder of cones are L cones
cones AND NOT S_cones AND NOT M_cones TAGGED L_cones
PUT L_cones OF L_unit
// connect each pixel to one nearest S cone by a junction
CONNECT pixels TO NEAREST S_cones WITH p2S_junction
// the same to M cones
CONNECT pixels TO NEAREST M_cones WITH p2M_junction
// the same to L cones
CONNECT pixels to NEAREST L_cones WITH p2L_junction
```

Directed Graph

In some implementations, assigning of the tag network subsets may be configured to enable representation of the network as a directed graph. A directed graph or digraph may comprise a pair G=(V,A) of elements, where a set V, whose elements may be called vertices or nodes, and a set A of ordered pairs of vertices, called arcs, directed edges, or arrows. In HLND, the term node may be used for vertices, and connections are the edges.

HLND and GUI

In some implementations, the HLND may comprise a Graphical User Interface (GUI). The GUI may be configured to translate user actions (e.g., commands, selections, etc.) into HLND statements using appropriate syntax. The GUI may be configured to update the GUI to display changes of the network in response to the HLND statements. The GUI may provide a one-to-one mapping between the user actions in the GUI and the HLND statements. Such functionality may enable users to design a network in a visual manner by, inter alia, displaying the HLND statements created in response to user actions. The GUI may reflect the HLND statements entered, for example, using a text editor module of the GUI, into graphical representation of the network.

This "one-to-one mapping" may allow the same or similar information to be unambiguously represented in multiple formats (e.g., the GUI and the HLND statement), as different formats are consistently updated to reflect changes in the network design. This development approach may be referred to as "round-trip engineering".

User Actions in HLND

In some implementations, the GUI may support user actions including creating nodes, selecting one or more subsets of the network, connecting nodes, tagging nodes within a selected subset, and/or other user actions. In some implementations, the GUI may support defining of network objects. Some exemplary user actions are described in detail below.

Create Nodes

Figure 12:
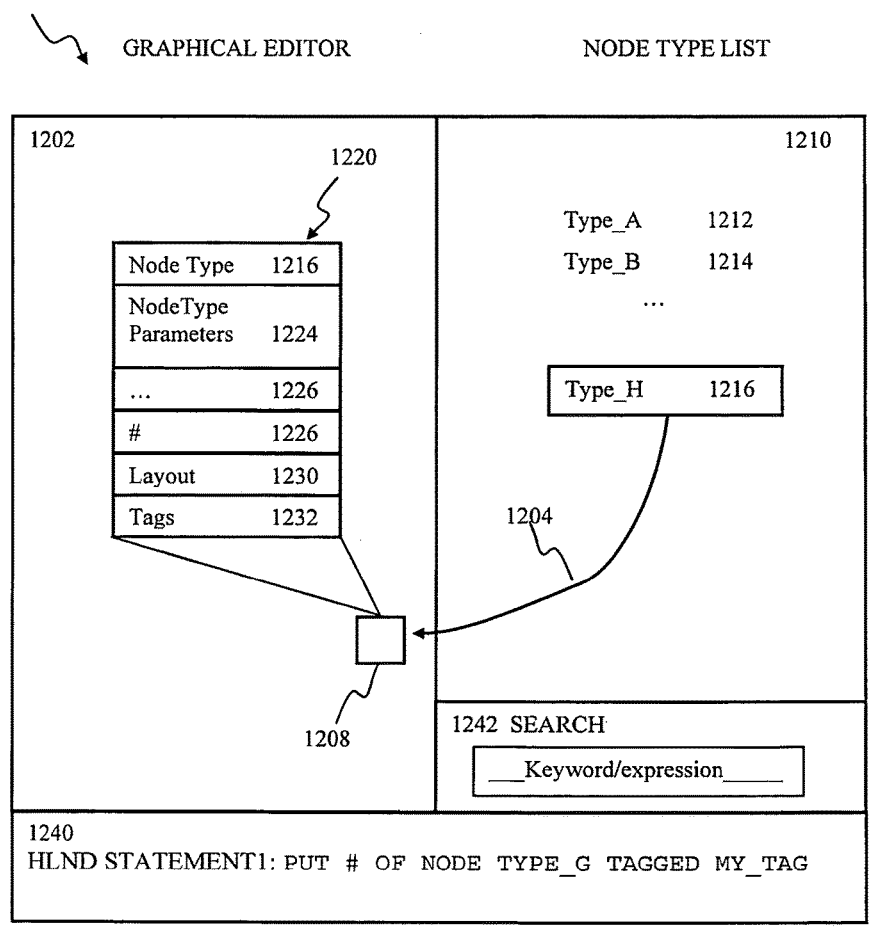
FIG. 12 is a block diagram illustrating node creation using HLND GUI interface, in accordance with one or more implementations.

Referring now to FIG. 12, node creation using GUI is illustrated, in accordance with one or more implementations. In some implementations, creating nodes of the neural network may require information including a type of node to be instantiated and/or generated, a number of nodes to be created, and/or other information. In some implementations, users may provide information including list TAGs to be assigned to the crated nodes, additional parameters for instantiating and/or initializing nodes, and/or other information. Additional parameters for instantiating and/or initializing nodes may depend on a specific network implementation, such as, for example, instructions on how to lay out the nodes to be instantiated, that is, how to assign numerical spatial tags.

The above GUI Node Creation functionality may be supported by one or more appropriate instructions of the HLND kernel that implement node generation. See, for example, Listing 10, supra, for more detail. When a user enters the HLND node generation instruction (statement), the GUI may generate a graphical representation (e.g., a unique symbol, pictogram, and/or an icon) in the graphical editor corresponding to the respective node (or nodes). Entry of HLND statements by users may be effected by various means, including but not limited to, text entry, speech, soft keys (icons), and/or other means configured for HLND statement entry.

A user may employ the GUI 1200 of FIG. 12 to perform node creation. According to some implementations, a user may select a node type from available list of node types (the list 1210 in FIG. 12); drag and drop (as illustrated via the arrow 1204 in FIG. 12) the selected node type (e.g., the type 1216 in FIG. 12) into an editor panel 1202, where the node is represented with a unique node symbol 1208; provide additional parameters (if needed) in via a supplementary entry means (such as, for example, a pop-up menu 1220 in FIG. 12) that is associated with the specific node type 1216; and/or perform other actions to create a node.

The search box 1242 may allow the user to filter the list of displayed node types 1212, 1214, and 1216 using one or more keywords. This may facilitate node type selection where there are large number of node types available. The pop-up menu 1220 may enable the user to graphically specify a number of nodes 1226, parameters for the node instantiation 1224, layout process 1230, additional tags 1232, and/or other information associated with node creation.

The GUI may allow the user to switch back and forth between the text editor (HLND statement 1240) and the GUI node creation. By way of non-limiting example, selecting different parameters/option for the layout of the nodes in the GUI may update the HLND statement. Changing the additional TAGs assigned to the nodes created in the HLND statement may update this information in the GUI.

The GUI interface shown in FIG. 12 is not intended to be limiting as other implementations are contemplated and within the scope of the disclosure. For example, in some implementations, the GUI may include pull down lists, radio buttons, and/or other elements.

Select Network Subset

Figure 13:
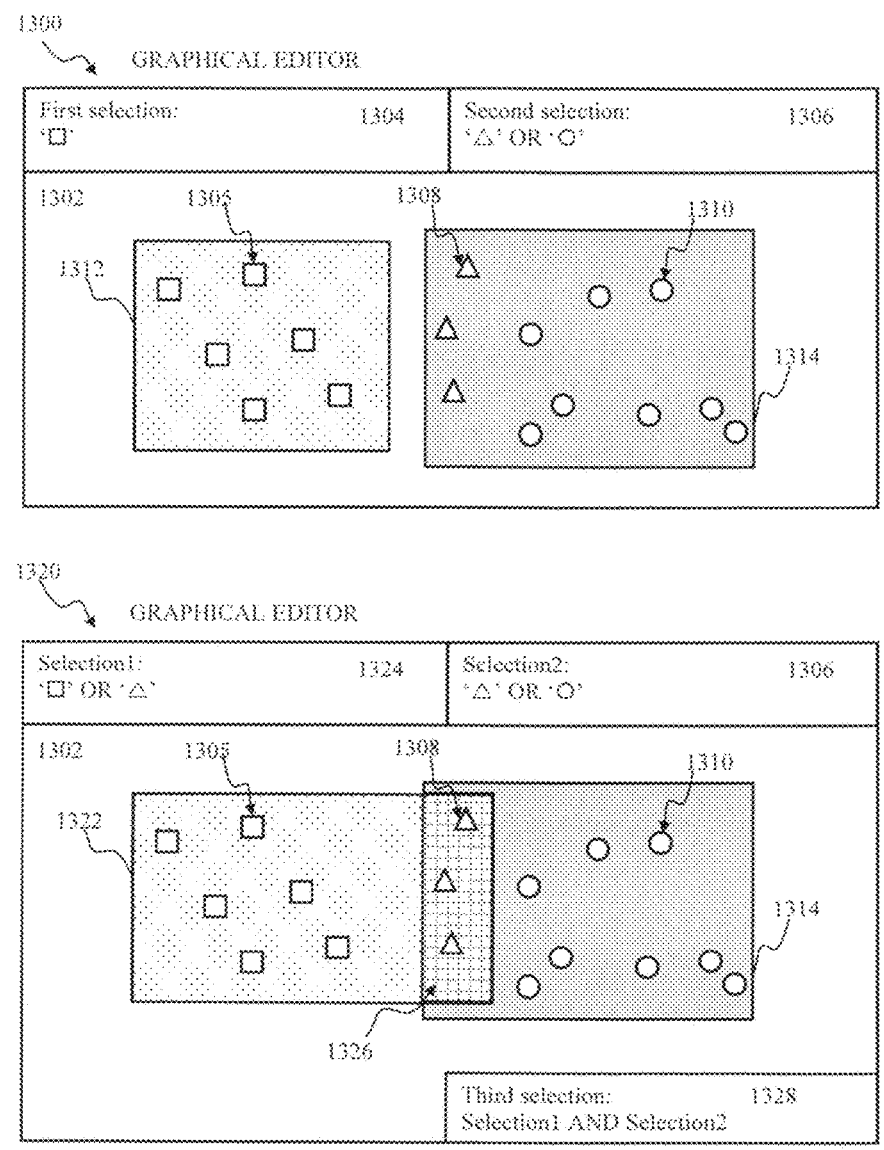
FIG. 13 is a block diagram illustrating node subset selection using HLND GUI interface, in accordance with one or more implementations.
Figure 13A:
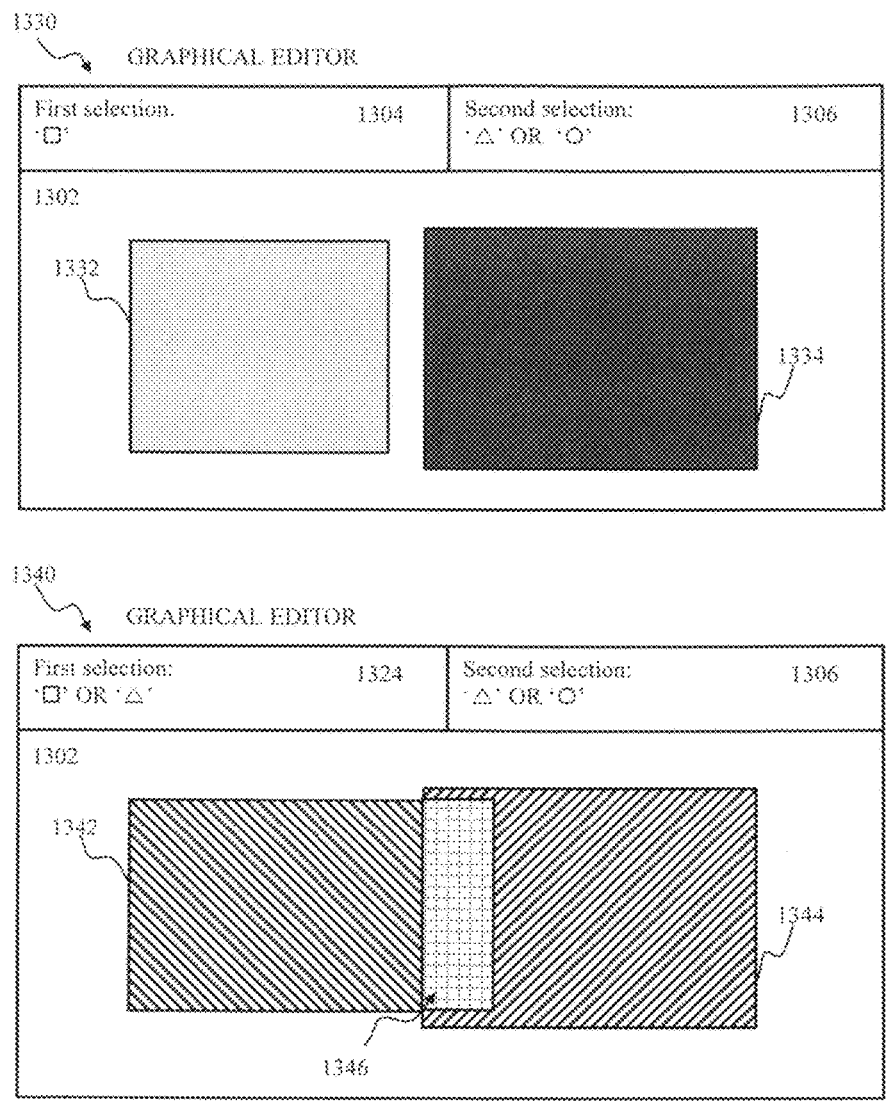
FIG. 13A is a block diagram illustrating node subset selection using HLND GUI interface, in accordance with one or more implementations.
Figure 13B:
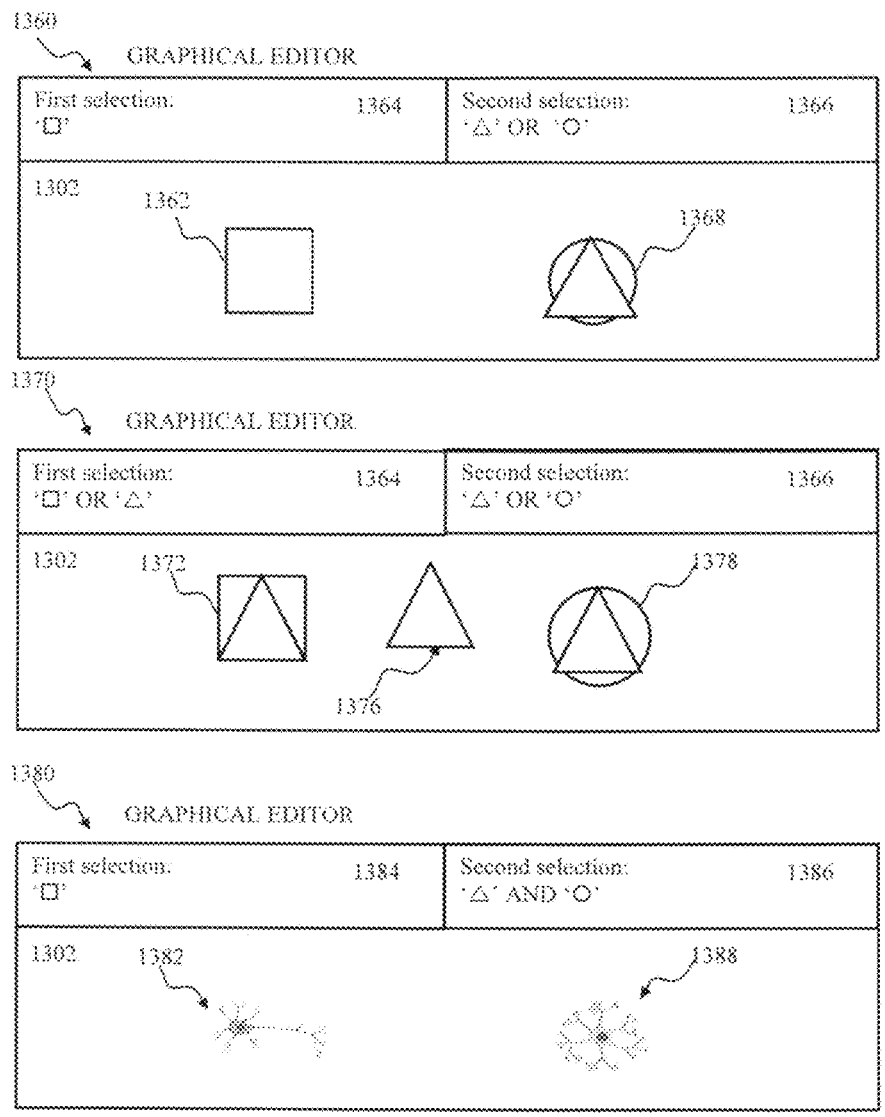
FIG. 13B is a block diagram illustrating node subset selection using HLND GUI interface, in accordance with one or more implementations.

Referring now to FIGS. 13, 13A, and 13B, different exemplary implementations of node subset selection are shown and described in detail. The GUI 1300 of FIG. 13 may comprise a network layout panel 1302, two or more selection description panels 1304 and 1306, and/or other components. The network, shown in the panel 1302, may comprise a plurality of nodes with different tags 1305, 1308, and 1310, depicted as '□', 'Δ', '○', respectively. The selection description panels 1304 and 1306 may comprise a Boolean portion of HLND statements, corresponding to respective subset.

In some implementations, Select Network Subset user action may correspond to selecting members of the network using the GUI editor (e.g., the GUI of FIG. 13). A user may select a subset of the network, for example, by using a mouse (or other pointing device, such as trackball, fingers on a touch-pad device like and iPad from Apple, light pen, and/or other technology). The subset selection using GUI may be achieved via a selective clicking/tapping graphical symbols corresponding to the desired members of the network, click and drag to select an area of the network, a combination thereof, and/or other actions to select a subset. The subset selection action of the GUI may be supported by the respective instructions of the HLND kernel that implement subset selection. See, for example, listings 6-7, supra, for more detail.

As shown in FIG. 13, the node subset 1312 may comprise nodes comprising the tag 1305, while the subset 1314 may comprise nodes having both tags 1308 and 1310. Once the subsets 1312 and 1314 are selected, the Boolean expressions in the panels 1304 and 1306 may be updated accordingly.

In some implementations, the network shown in the GUI 1320 of FIG. 13 comprises two subsets including the subset 1322 comprising tags 1305 and 1308, the subset 1314 comprising the tag 1310, and/or other subsets. The selection description panel 1324 may be updated to reflect the Boolean expression corresponding to the tag content of the subset 1322. In some implementations, additional subsets may be generated by forming a subset 1326 comprising an intersect between the subsets 1322 and 1314, as indicated by the Boolean expression 1328.

By way of non-limiting example, responsive to a user entering the Boolean expression for the subset selection statement, e.g., the expression 1306 in FIG. 13), the GUI may display (for example, using a shaded rectangle in FIG. 13) the corresponding selected members of the subset in the graphical editor. In some implementations, the GUI may generate a graphical representation in the graphical editor corresponding to the subset (or subsets) selection, as illustrated with respect to FIGS. 13A-13B below. Examples of graphical representations may include one or more of a unique symbol, pictogram, an icon, and/or other graphical representations. In some implementations, a graphical representation may include a change in a graphical attribute including a change in one or more of color, shading pattern, and/or other graphical attribute.

FIG. 13A illustrates an exemplary implementation of node subset selection, which may be applicable to network subsets comprising large numbers of nodes where depiction of individual nodes is not always practical. The network shown in the GUI implementation 1330 of FIG. 13A may comprise two subsets 1332 and 1334, which may be depicted using differently shaded rectangles. The network shown in the GUI implementation 1340 of FIG. 13A may comprise subsets, which may be depicted by shapes with different fill patterns (see, e.g., rectangles 1342 and 1344 in FIG. 13A). The subset 1346 in FIG. 13A may be selected as 1342∩1344.

In some implementations, the GUI user actions may be represented using unique symbols 1362 and 1368, as illustrated in network 1360 shown in FIG. 13B. The unique symbols 1362 and 1368 may represent subsets 1304 and 1306, respectively, and may be subset specific. By way of non-limiting example, the color and/or other identifying quality of the unique symbol may be configured in accordance with the tags that are used to identify the subset. The shape and position of the symbol in the graphical editor panel 1302 may be configured according with the spatial tags of the members of the subset. This may be illustrated by symbols 1362, 1368, 1372, 1376, 1378, 1382, and 1388, which may depict subsets of the network illustrated GUI implementations 1360, 1370, and 1380. In some implementations, the symbol may be configured based on the element type. In some implementations, the symbol choice may depend on whether the subset comprises (i) only nodes, (ii) only connections; or (iii) nodes and connections.

In some implementations, the same network configuration (e.g., the subset 1312 of FIG. 13) may be represented within the GUI graphical panel (e.g., the panel 1302 of FIG. 13) using different symbols/icons. In some implementations, which may correspond to a low-level detail network view (corresponding to, for example, no or low zoom), the subset may be represented using a symbol (e.g., the symbol 1362 of FIG. 13B) without showing individual elements of the subset.

In some implementations, which may correspond, for example, to a network with limited processing capability or a network configured for batch updates, the subset may be represented using a symbol without showing individual elements of the subset.

In some implementations, which may be associated with a high-level detail network view (corresponding to, for example, to high zoom level, and/or when processing resources are available to process information related to individual element of the subset), the subset may be represented using graphical depiction providing further detail of the subset (e.g., the representation 1312 of FIG. 13 that illustrates individual subset elements at their appropriate locations.

In some implementations, the HLND framework selection operation may be performed to assign additional tags to the selected members, to use the selected members (nodes in this case) in a connection statement, and/or to perform other actions.

The GUI may allow the user to switch back and forth between the text editor (HLND statement) and the GUI subset selection. By way of non-limiting example, selecting different node members using the GUI may cause updates of respective the HLND statements. Changing the selection in the text editor may update the selection in the graphical editor. In some implementations, updating the selection may include highlighting and/or otherwise visually emphasizing the selected members.

Connect Nodes

The node connection user action may correspond to creating connections between network nodes. According to some implementations, in creating inter-node connections, the HLND kernel may require one or more of a first subset selection (e.g., a subset of nodes the connections will originate from), a second subset selection (e.g., a subset of nodes the connections will terminate at), a connection type used to connect the first subset to the second subset, and/or other information associated with connecting nodes.

In some implementations, one or more additional parameters may be provided to the HLND kernel including one or more of parameters for setting the connectivity mapping (e.g., an all-to-all, one-to-one, one-to-nearest, and/or other user defined connection mappings), parameters for instantiating and/or initializing connection instances (e.g., initializing the synaptic weights), list TAGs to be assigned to the created connection instances, and/or other parameters.

The HLND kernel may implement instructions configured to connect nodes in the network. (See, for example, listings 16-17, supra, for more detail). By way of non-limiting example, when a user enters the connection instruction, the GUI may create a corresponding graphical representation (e.g., draws a link/arrow from source to destination selection of nodes) in the graphical editor to illustrate the connections.

In accordance with one or more implementations, the user may use the GUI to select a source subset selection of network members, select a destination selection of network members, drag and drop the source selection onto the destination selection to connect first selection to the second selection, and/or perform other actions. The GUI may generate link/arrow elements in the graphical view representing the respective connections between the source and the target members.

In some implementations, a pop-up menu associated with the connection elements (link/arrow) may allow users to select a connection type from the available list of connection types. In some implementations, the pop-up menu may allow users to provide additional parameters for instantiating and/or initializing connection instances. In some implementations, the pop-up menu may allow users to set parameters for setting the connectivity mapping.

The GUI may allow the user to switch back and forth between the text editor (HLND statement) and the GUI connection creation. By way of non-limiting example, selecting different node members using the GUI may cause updates of the HLND statement that are associated with the node description. Changing the selection in the text editor may update the selection (e.g., highlights the selected members) in the graphical editor.

Figure 14:
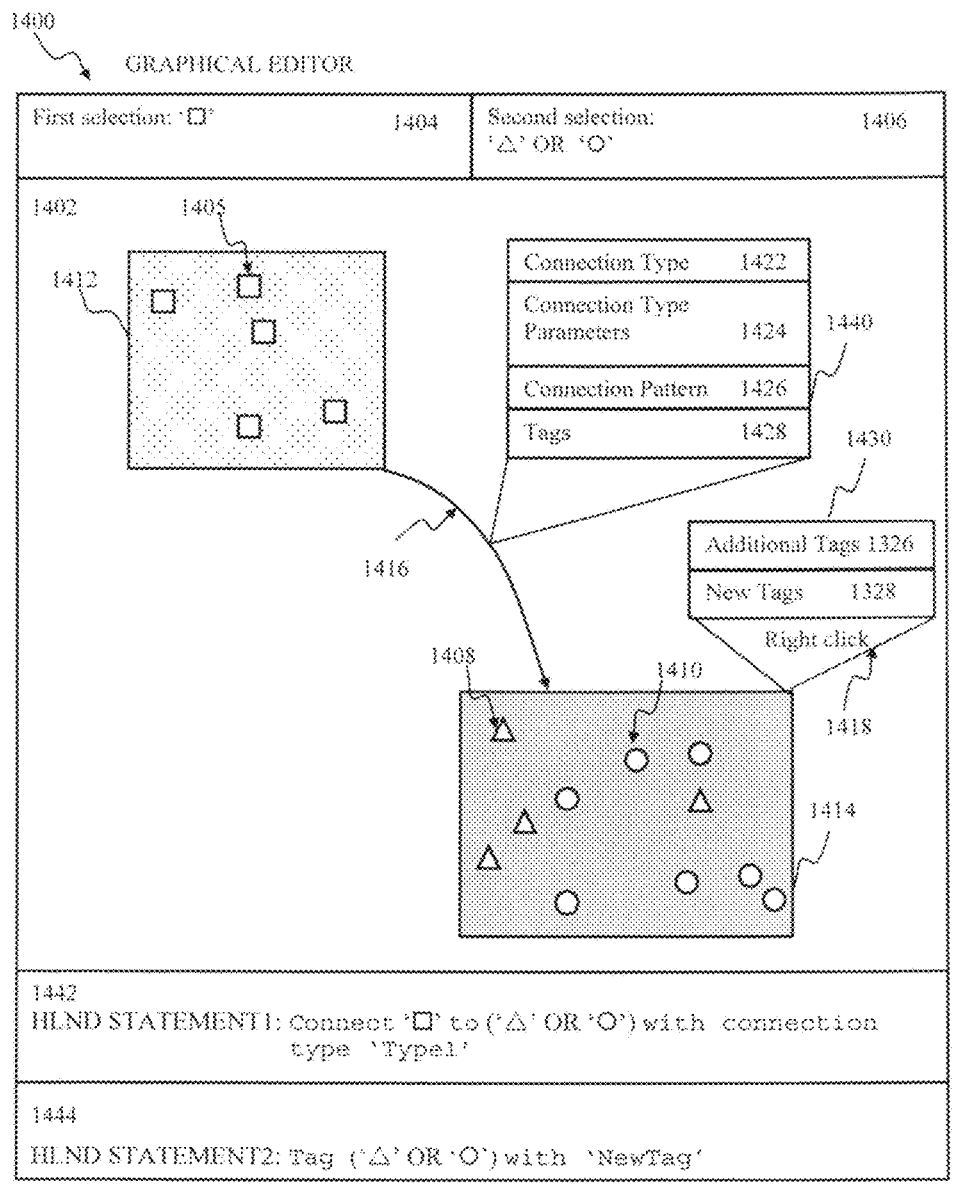
FIG. 14 is a block diagram illustrating node selection, tagging, and connection generation using HLND GUI interface, in accordance with one or more implementations.

FIG. 14 illustrates an exemplary implementation of using GUI for connecting two node collections. The GUI 1400 may comprise the network node view panel 1402, one or more node collection selection fields 1406 and 1404, HLND statement fields 1442 and 1444, and/or other components. When node collections 1412 and 1414 are selected using, for example, a mouse click-and-drag actions in the HLND GUI field 1402, the node collection selection fields 1404 and 1406 may be updated to reflect selected collections. As illustrated in FIG. 14, the collection 1412 may comprise the nodes with the tag 1405 (depicted as 'squares'). The collection 1414 may comprise the nodes with the tag 1408 (depicted as 'triangles') and with the tag 1410 (depicted as 'circles'). The node collection selection fields 1404 and 1406 may be updated to display selected node with the tags corresponding to the collections 1412 and 1414, respectively.

According to some implementations, additional tags may be assigned to the collections 1412 and 1414 by invoking, for example, right click on a selection to assign new tags for the selected members of the network. The HDLN statement for the tagging may be automatically generated.

A supplementary graphical data entry means (e.g., the pop-up menu 1430 in FIG. 14) may be invoked in some implementations using, e.g., a right click, as illustrated by the line 1418. The menu 1430 may be used to, inter alia, assign additional tags 1432 or new tags 1434 to the selected nodes.

In some implementations, by using drag-and-drop action, using a mouse and/or a finger on a touch pad device, illustrated by the arrow 1416 in FIG. 14 in the GUI field 1402, the first selection may be 'dropped' onto the second selection, which may instruct the HLND engine to create connections between the nodes 1405 of the collection 1412 and the nodes 1408 and 1410 of the collection 1414.

Additional supplementary graphical data entry means (e.g., the pop-up menu 1420 in FIG. 14) may be used to, inter alia, specify parameters for the connections. Specifying parameters for the connections may include one or more of setting connection type 1422, initializing parameters 1424 for the connection type, specifying connectivity pattern 1426, assigning tags to the connections 1428, and/or other actions.

For one or more user actions performed with the node selections 1412 and 1414 using the GUI 1400, corresponding HLND statements may be automatically generated and displayed in the statement fields 1442 and 1444, respectively.

The GUI interfaces shown in FIGS. 12-14 are not intended to be limiting as other implementations are contemplated with in the scope of the disclosure. For example, some implementations may include pull down lists, radio buttons, and/or other components.

Relation of the HLND to the END Format

The HLND format may be designed to be compatible and/or to be used in conjunction with the Elementary Network Description (END) format, which is described in the U.S. patent application Ser. No. 13/239,123 entitled "ELEMENTARY NETWORK DESCRIPTION FOR NEUROMORPHIC SYSTEMS" filed on Sep. 21, 2011, incorporated supra. In some implementations, instances of END units may be generated based on a HLND description (e.g., END implementations of model neurons). Instances of END junctions and/or END synapses may directionally connect the units. The HLND may define the anatomy, while the neural and synaptic dynamics may be defined in the applied END classes. HLND may hide complexity and/or low-level difficulties of END, and may make network design a simple process.

The generated END instances may be used to generate a neural network engine that implements and/or runs the specified model. That is, END instances may be used to generate an engine that implements the network defined by the HLND description and/or the applied END classes. The engine may be executed on arbitrary hardware platform from PC, FPGA, any specialized END compatible hardware, and/or other computer hardware.

Figure 11:
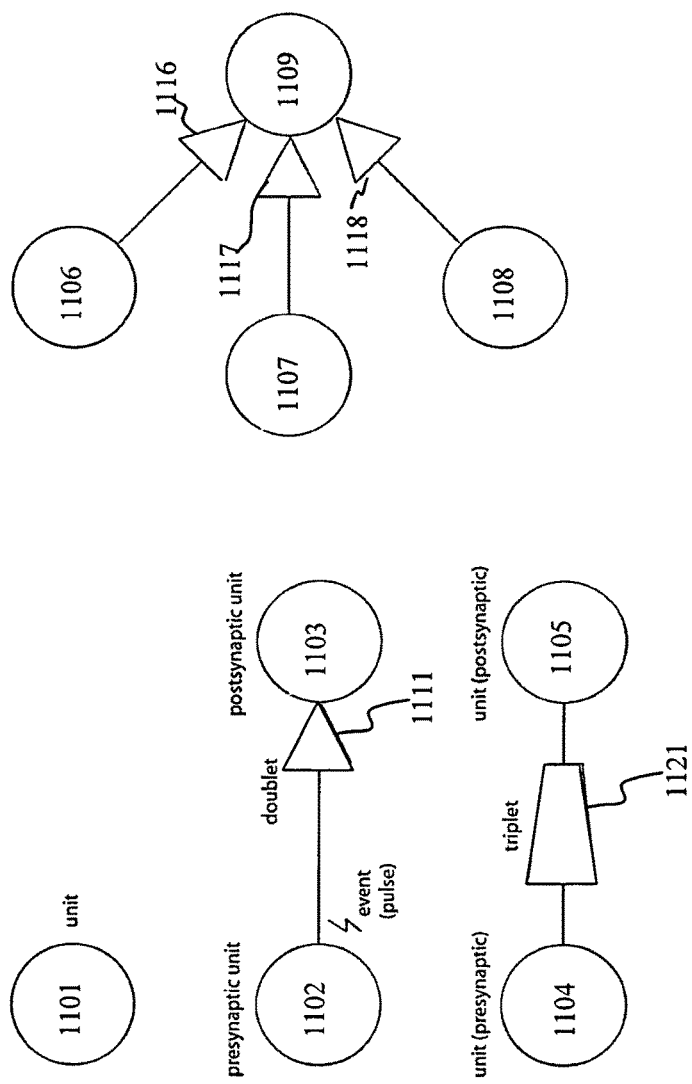
FIG. 11 is a block diagram illustrating various exemplary implementations of the END engine.

FIG. 11 illustrates three basic structures of the END engine, which may be implemented on a general purpose RISC/CISC central processing unit (CPU), graphics processing unit (GPU), in an integrated circuit (e.g., an ASIC), and/or other processor. The structures of the END engine may correspond to the 'unit' 1101, the 'doublet" 1111, and/or the 'triplet' 1121 in FIG. 11. The END engine may be configured to execute the unit, doublet, and triplet rules, and/or access to the memories of these elements. The END formats may be treated as the hardware specification language that would configure a semiconductor circuit having such units, doublets, and triplets that executes a specified neuronal network.

In some implementations, individual basic structures (e.g., unit, doublet, and/or triplet) may be implemented as a single thread on a multi-thread processor. In some implementations, individual structures may be implemented as a super-unit, super-doublet, and/or super-triplet, which may comprise dedicated circuits configured to processing units, doublets, and/or triplets respectively using time multiplexing. Some implementations may include three different circuits, one for each of units, doublets, and triplets.

In some implementations, unit 1101 may represent a neuron and/or a part of a neuron (e.g., a dendritic compartment). In another example, unit 1101 may represent a population of neurons. The activity of the neuron may represent a "mean-firing rate" activity of the population and/or some other mean-field approximation of the activity of the population. Individual units may be associated with memory variables and an update rule that describes what operations may be performed on its memory. The operations may be clock-based (i.e., executed every time step of the simulation) or they may be event-based (i.e., executed when certain events are triggered).

Depending on the values of the unit variables, the units may generate events (e.g., pulses or spikes) that trigger synaptic events in other units via doublets. For example, a unit 1102 in FIG. 11 may influence unit 1103 via the doublet 1111, which may represent a synapse from pre-synaptic neuron (pre-synaptic unit 1102) to post-synaptic neuron (post-synaptic unit 1103).

Individual units may have after-event update rules, which may be triggered after the event is triggered. These rules may be responsible for modification of unit variables that are due to the events, e.g., the after-spike resetting of voltage variables.

Individual doublets may be associated with memory variables. Individual doublets may access variables of the post-synaptic unit. Such access may include read, write, and/or access mechanisms. Individual doublets may be associated with a doublet event rule that makes a change to the doublet memory to implement synaptic plasticity. Individual doublets may be associated with a doublet event rule that makes a change to the post-synaptic unit memory to implement delivery of pulses. A doublet event rule may encompass some or all the synaptic rules described in the END formats above.

Because multiple doublets (e.g., 1116-1118 in FIG. 11) may connect corresponding multiple pre-synaptic units 1106-1108 to a single post-synaptic unit 1109, the doublets may modify the post-synaptic unit memory in parallel and/or in arbitrary order. The result may be order-independent. This may be achieved when the operation on the post-synaptic unit memory is atomic addition (as in GPUs), atomic multiplication (which is equivalent to addition via logarithmic transformation), and/or resetting to a value (with all the doublets trying to reset to the same value). The post-synaptic unit variable that is being modified by the doublet event rule may not be used in the rule. Otherwise, the result may depend on the order of execution of doublet event rules.

Figure 15:
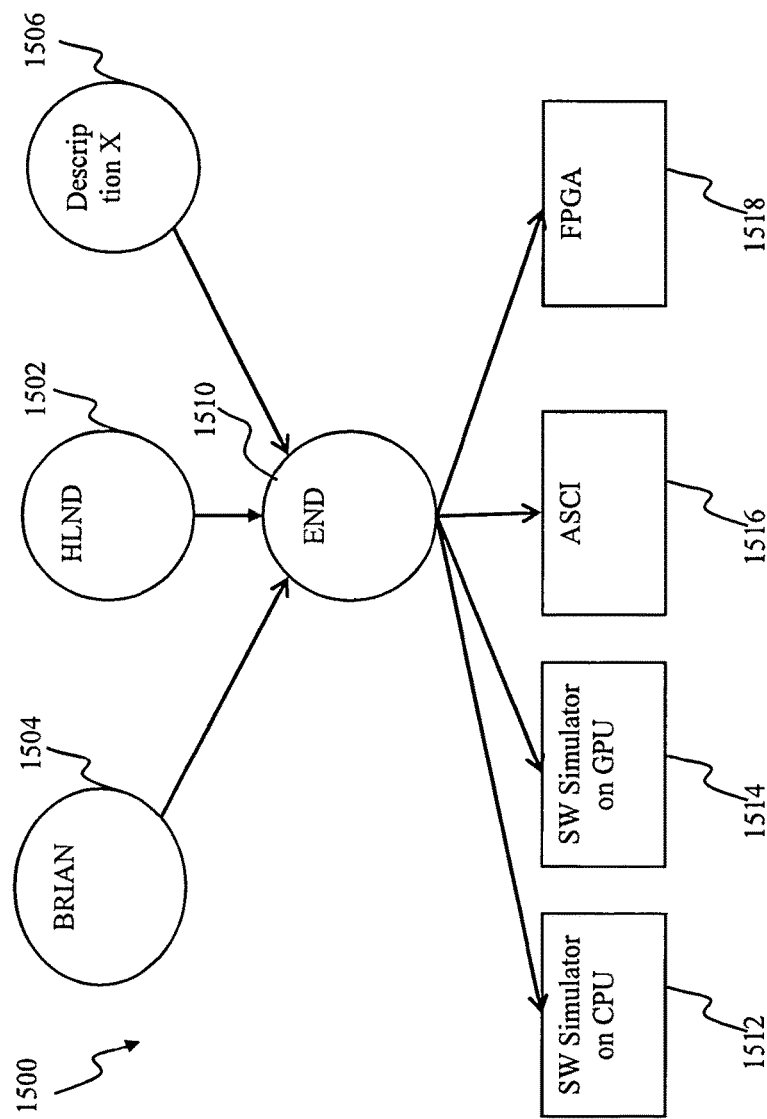
FIG. 15 is a block diagram illustrating neural network computations using HLND and END description, in accordance with one or more implementations.

Referring now to FIG. 15, an exemplary implementation of a neural network definition system comprising HLND kernel and END description is shown and described in detail. In FIG. 15, the circles 1504, 1502, and 1506 may represent different higher level network description methods or formats. The circle 1510 may represent the END description of the network. Arrows from 1504, 1502, and 1506 may denote the process of conversion to the END description. For example, a software that processes the HLND description of a network (e.g., the HLND statements) may generate the END description of the same network. The rectangles 1512, 1515, 1516, and 1518 in FIG. 15 may denote various hardware platform implementations of the network defined by the END description 1510. The arrows between the circle 1510 and the rectangles 1512, 1515, 1516, and 1518 may denote the engine generation process. By way of non-limiting example, the arrow between the END description 1510 and the rectangle 1512 may represent the process of generating an executable that implements the END network and is configured to runs on a CPU. The HLND definition 1502 may be processed and converted into the END description 1510. The END description may be configured to be processed (e.g., by various software applications) to generate platform specific machine executable instructions. The platform specific machine executable instructions may be configured to be executed on a variety of hardware platforms, including but not limited to, elements general purpose processor 1512, graphics processing unit 1514, ASIC 1516, FPGA 1518, and/or other hardware platforms.

Other network description formats may be used with the process 1500, such as, for example BRIAN 1504 and/or other neuromorphic network description format 1506 (e.g., NEURON) configured to generate the END description of the network, as illustrated in FIG. 15.

Exemplary Implementation of Computerized HLND Apparatus

Figure 16:
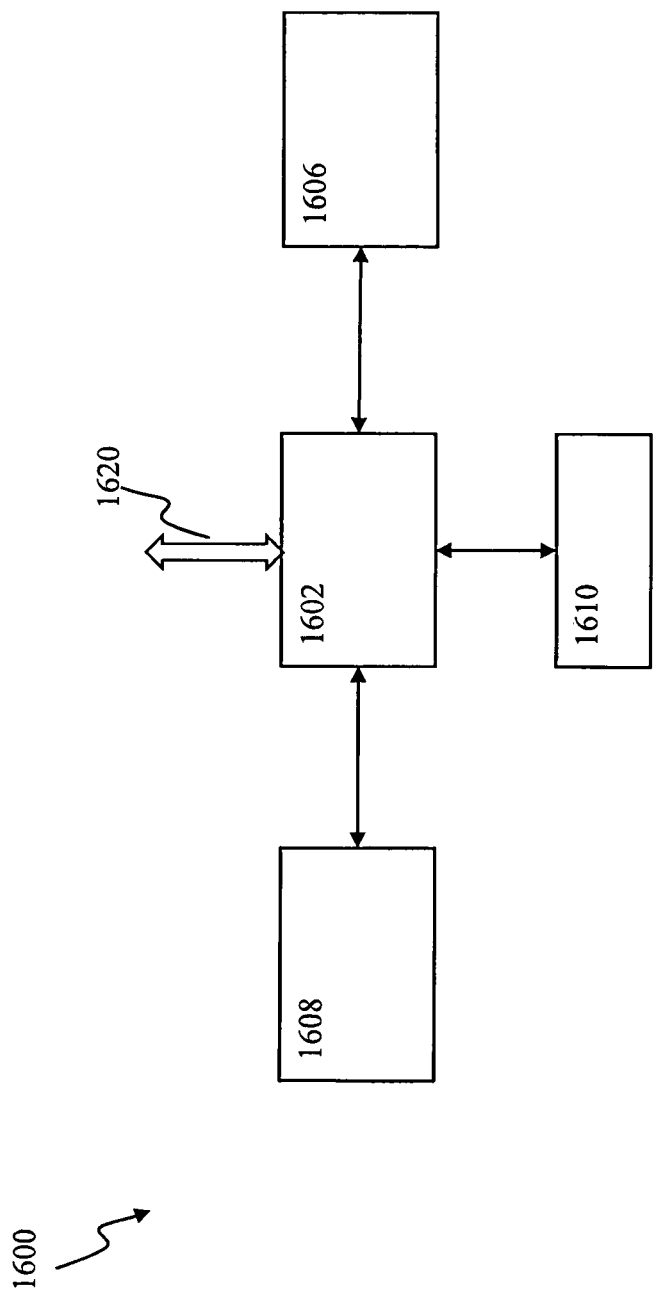
FIG. 16 is a block diagram illustrating a computerized apparatus useful with the HLND framework, in accordance with one or more implementations.

An exemplary implementation of a computerized network processing apparatus configured to utilize HLND framework in designing a neural network (e.g., the network 1500 of FIG. 15) is shown and described with respect to FIG. 16. The computerized apparatus 1600 may comprise a processing block (e.g., a processor) 1602 coupled to a nonvolatile storage device 1606, random access memory (RAM) 1608, user input/output interface 1610, and/or other components. The user input/output interface may include one or more of a keyboard/mouse, a graphical display, a touch-screen input-output device, and/or other components configured to receive input from a user and/or output information to a user.

In some implementations, the computerized apparatus 1600 may be coupled to one or more external processing/storage devices via an I/O interface 1620, such as a computer I/O bus (PCI-E), wired (e.g., Ethernet) or wireless (e.g., WiFi) network connection.

In some implementations, the input/output interface may comprise a speech input device (e.g., a microphone) configured to receive voice commands from a user. The input/output interface may comprise a speech recognition module configured to receive and recognize voice commands from the user. Various methods of speech recognition are considered within the scope of the disclosure. Examples of speech recognition may include one or more of linear predictive coding (LPC)-based spectral analysis algorithm run on a processor, spectral analysis comprising Mel Frequency Cepstral Coefficients (MFCC), cochlea modeling, and/or other approaches for speech recognition. Phoneme/word recognition may be based on HMM (hidden Markov modeling), DTW (Dynamic Time Warping), NNs (Neural Networks), and/or other processes.

The END engine 1510 may be configured to convert an HLND description of the network into a machine executable format, which may be optimized for the specific hardware or software implementation. The machine executable format may comprise a plurality of machine executable instructions that are executed by the processing block 1602.

It will be appreciated by those skilled in the arts that various processing devices may be used with various implementations, including but not limited to, a single core/multicore CPU, DSP, FPGA, GPU, ASIC, combinations thereof, and/or other processors. Various user input/output interfaces may be applicable to various implementations including, for example, an LCD/LED monitor, touch-screen input and display device, speech input device, stylus, light pen, trackball, and/or other user interfaces.

Execution of GUI User Actions

In some implementations, the network design system, e.g., the system 1600 of FIG. 16, may automatically convert the GUI actions into HLND instructions and/or into END statements. The HLND instruction may cause automatic updates of the GUI representation and/or of the END description.

Figure 17:
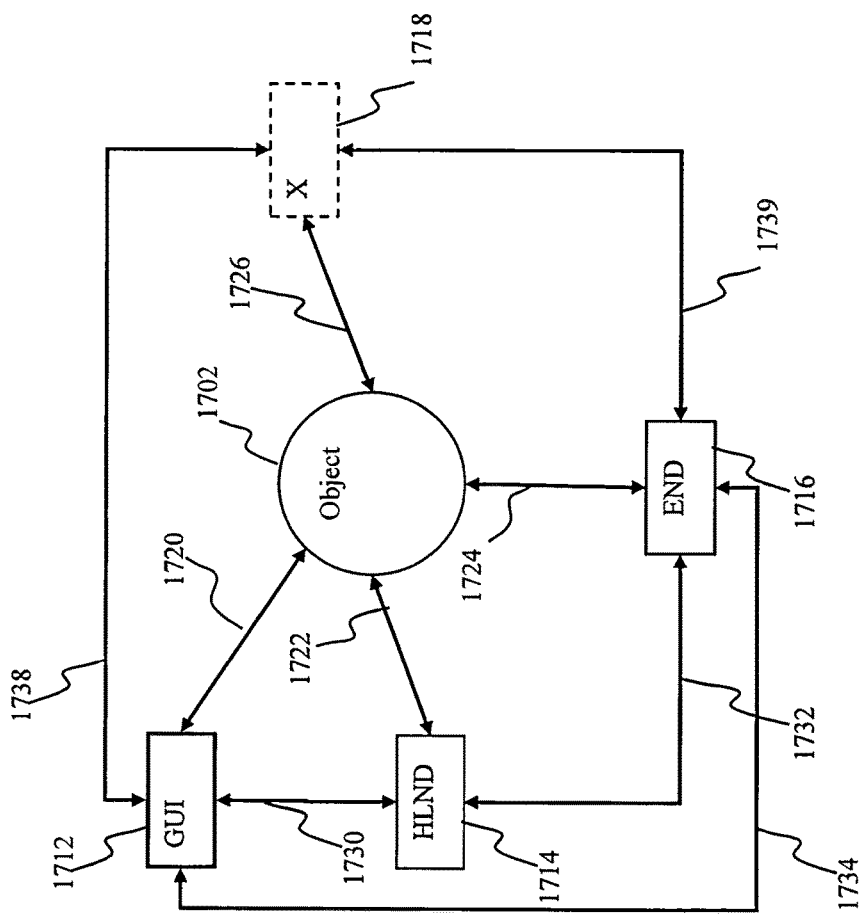
FIG. 17 is a block diagram illustrating data flow useful with the HLND framework, in accordance with one or more implementations.

FIG. 17 illustrates one approach to performing seamless updates of different representations corresponding to the same network design element. The network description 1702 (e.g., node, connection, subset, etc.) may contain information necessary to define the network. In some implementations, the network description (1702) may comprise one or more of node type, node type parameters, node layout parameters, tags, and/or other information. In some implementations, the network description (1702) may comprise one or more of connection type, connection type parameters, connection pattern, tags, and/or other information. Various other description types may exist (e.g., subsets), which may comprise appropriate information associated therewith.

As illustrated in FIG. 17, a single object (e.g., the object 1702) may have one or more representations related thereto, which may include GUI representation 1712 (e.g., using the GUI editor 1302 of FIG. 13), the HLND representation 1714 (e.g., using the HLND statement described supra with respect to FIG. 14), the END representation 1716 (see, e.g., FIG. 15), and/or other representations (depicted by the rectangle 1718). Responsive to an object property (i.e., the object data element) being generated and/or updated, the corresponding representations of the object (e.g., the representations 1712, 1714, 1716, and 1718) may be updated using bi-directional pathways 1720, 1722, 1724, and 1726, respectively.

In some implementations, responsive to a user GUI action modifying a selection, the corresponding HLND statement(s) (e.g., the HLND representation 1714 in FIG. 17) may be updated. In some implementations, the END instructions (e.g., the END representation 1722 in FIG. 17) may be updated.

In some implementations, the END instructions may be executed by the apparatus thereby enabling a more detailed and accurate representation of the network.

In some implementations, nodes may be rendered within the GUI using unique color symbol when the statement to create units is available in the network description framework.

In some implementations, nodes may be rendered within the GUI at their correct location with unique (for the whole subset) symbols responsive to the coordinates of the nodes being available—that is, when the connections statement is at least partially processed.

In some implementations, connections between two subsets may be rendered by the GUI using, for example, a single line, when the connect instruction is available in the network description framework.

In some implementations, connections between two subsets may show the detailed connectivity structure once the pre-node and post-node information for the connection instances are available (i.e., have been previously generated)—that is, once the connection statement is at least partially processed.

In some implementations, connections between two subsets may show the detailed connectivity structure with unique properties (e.g., line width representing a connection) per connection responsive to the pre-node information, the post-node information, and/or the initial weight for the connection instances being available—that is, once the connection statement is at least partially processed.

As is appreciated by those skilled in the arts, other representations (e.g., as depicted by the rectangle 1718 in FIG. 17) may exist and may be compatible with various implementations, provided they conform to the update framework described herein.

In some implementations, data exchange between different representations (e.g., the representations 1712, 1714, 1716, and 1718 in FIG. 17) may be enabled via direct links denoted by arrows 1730, 1732, 1734, 1736, 1738, and 1739 in FIG. 17. For clarity, not all direct connections between the representations 1712, 1714, 1716, and 1718 are shown in FIG. 17.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

Although the disclosure has been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed:

1. A method of implementing a neural network using an instruction set, the method comprising:
   generating a graphical representation of a plurality of nodes of the neural network via a first panel of a graphical user interface (GUI);
   converting the graphical representation to a high-level representation of the plurality of nodes to be displayed concurrently in a second panel of the GUI with the graphical representation, the high-level representation comprising a plurality of instructions of the instruction set, the plurality of instructions defining an architecture of the neural network including a node definition specifying an internal implementation of a node of the neural network including dynamics of a node type, the instruction set comprising a first instruction corresponding to at least one node of the plurality of nodes, the first instruction comprising a syntax based on a natural English language structure and grammar to instantiate the at least one node within the neural network;
   encoding the high-level representation into a low-level hardware independent format; and
   operating the neural network based on the low-level hardware independent format.

2. The method of claim 1, wherein the first instruction comprises a keyword selected from a group consisting of CREATE, MAKE, and PUT.

3. The method of claim 2, wherein the keyword comprises only one keyword.

4. The method of claim 1, wherein:
   the at least one node is characterized by a spatial coordinate; and
   the first instruction assigns a desired location within the neural network to the spatial coordinate, the assignment being performed as a part of the instantiating of the at least one node.

5. The method of claim 4, wherein the first instruction comprises a keyword selected from a group consisting of ON, IN, and AT.

6. The method of claim 5, wherein the keyword comprises only one keyword.

7. The method of claim 1, wherein:
   the instantiating of the at least one node comprises generating a first node and a second node; and
   the instruction set comprises a second instruction to generate a connection between the first node and the second node.

8. The method of claim 7, wherein the connection comprises a synapse.

9. The method of claim 7, wherein the connection comprises a junction.

10. The method of claim 7, wherein:
    instantiating the at least one node further comprises generating a plurality of nodes, the plurality of nodes comprising the first node and the second node;
    each node of the plurality of nodes comprising at least one tag to facilitate operation of the neural network; and
    the instruction set includes a third instruction to select a subset of the plurality of nodes based on the at least one tag.

11. The method of claim 7, wherein the second instruction comprises a keyword selected from a group consisting of CONNECT, LINK, and PROJECT.

12. The method of claim 7, wherein the second instruction comprises a keyword selected from a group consisting of WITH, BY, and USING, the keyword adapted to specify a type of the connection.

13. The method of claim 1, wherein:
    the neural network comprises a plurality of elements, each element of the plurality of elements having a tag associated therewith; and
    the first instruction identifies a subset of the plurality of elements, based at least in part on the tag.

14. The method of claim 13, wherein the compiling is based on a database comprising a plurality of tags.

15. The method of claim 13, wherein the instruction set comprises a second instruction to effect assignment of a new tag to the subset.

16. The method of claim 15, wherein the second instruction comprises a keyword selected from a list consisting of TAG, ASSIGN, and MARK.

17. The method of claim 1, wherein the instruction set further comprises a Boolean expression consistent with a structured English representation; and
    the structured English representation enables machine execution of the Boolean expression by at least in part an implicit assignment of logical AND operation between any two Boolean variables of the Boolean expression, where the two Boolean variables are separated by a separator keyword thereby.

18. The method of claim 17, wherein the separator keyword comprises a whitespace.

19. The method of claim 1, wherein the node definition also defines connectivity of the node.

20. The method of claim 1, further comprising:
    compiling the low-level hardware independent format into machine executable instructions for execution on a specific hardware platform; and
    executing the hardware dependent machine executable instructions to operate the neural network on the specific hardware platform.

21. A non-transitory computer readable medium having encoded thereon program code for implementing a neural network using an instruction set, the program code being executed by a processor and comprising:

program code to generate a graphical representation of a plurality of nodes of the neural network via a first panel of a graphical user interface (GUI);
program code to convert the graphical representation to a high-level representation of the plurality of nodes to be displayed concurrently in a second panel of the GUI with the graphical representation, the high-level representation comprising a first plurality of instructions of the instruction set, the first plurality of instructions defining an architecture of the neural network including a node definition, specifying an internal implementation of a node of the neural network including dynamics of a node type, the instruction set comprising a first instruction corresponding to at least one node of the plurality of nodes, the first instruction comprising a syntax based on natural English language structure and grammar to instantiate the at least one node within the neural network;
program code to encode the high-level representation into a low-level hardware independent format; and
program code to operate the neural network based on the low-level hardware independent format.

22. The non-transitory computer readable medium of claim 21, further comprising program code:
to compile the low-level hardware independent format into machine executable instructions for execution on a specific hardware platform, and
to execute the machine executable instructions to operate the neural network on the specific hardware platform.

23. The non-transitory computer readable medium of claim 22, wherein the low-level hardware independent format comprises Elementary Network Description (END) format.

24. The non-transitory computer readable medium of claim 23, wherein the hardware dependent machine executable instructions are central processing unit (CPU) instructions, graphics processing unit (GPU) instructions, or field programmable gate array (FPGA) instructions.

25. The non-transitory computer readable medium of claim 22, wherein the low-level hardware independent format comprises a plurality of functions for execution by a processing module.

26. The non-transitory computer readable medium of claim 22, wherein the high-level representation comprises a second plurality of instructions received via a user speaking the second plurality of instructions.

27. The non-transitory computer readable medium of claim 26, wherein speaking the second plurality of instructions is effected one instruction at a time.

28. The non-transitory computer readable medium of claim 26, further comprising program code to translate digitized user speech into one or more instructions of the instruction set.

29. The non-transitory computer readable medium of claim 21, wherein:
the at least one node is characterized by a spatial coordinate; and
the first instruction comprises a structured English language statement to assign a desired location within the neural network to the spatial coordinate, the assignment being effected substantially during the instantiating of the at least one node.

30. The non-transitory computer readable medium of claim 21, wherein instantiating the at least one node comprises generating a first node and a second node; and
the instruction set comprises a second instruction to connect the first node and the second node.

31. An apparatus for implementing a neural network, the apparatus comprising:
a memory; and
one or more processors coupled to the memory, the one or more processors being configured:
to generate a graphical representation of a plurality of nodes of the neural network via a first panel of a graphical user interface (GUI);
to convert the graphical representation to a high-level representation of the plurality of nodes to be displayed concurrently in a second panel of the GUI with the graphical representation, the high-level representation comprising a plurality of instructions of an instruction set, the plurality of instructions defining an architecture of the neural network including a node definition specifying an internal implementation of a node of the neural network including dynamics of a node type, and the instruction set comprising a first instruction corresponding to at least one node of the plurality of nodes, the first instruction comprising a syntax based on natural English language structure and grammar to instantiate the at least one node within the neural network;
to encode the high-level representation into a low-level hardware independent format; and
to operate the neural network based on the low-level hardware independent format.

32. The apparatus of claim 31, wherein:
the at least one node is characterized by a spatial coordinate; and
the one or more processors are further configured to generate the at least one node based on the first instruction, the first instruction assigns a desired location within the neural network to the spatial coordinate, the assignment being performed as a part of the instantiating of the at least one node.

33. The apparatus of claim 32, wherein the first instruction comprises a keyword selected from a group consisting of ON, IN, and AT.

34. The apparatus of claim 32, wherein:
instantiating the at least one node comprises generating a first node and a second node; and
the instruction set comprises a second instruction to connect the first node and the second node.

35. The apparatus of claim 31, in which the node definition also defines connectivity of the node.

36. The apparatus of claim 31, in which the one or more processors are further configured:
to compile the low-level hardware independent format into machine executable instructions for execution on a specific hardware platform; and
to execute the hardware dependent machine executable instructions to operate the neural network on the specific hardware platform.

37. An apparatus for implementing a neural network, comprising:
means for generating a graphical representation of a plurality of nodes of the neural network via a first panel of a graphical user interface (GUI);
means for converting the graphical representation to a high-level representation of the plurality of nodes to be displayed concurrently in a second panel of the GUI with the graphical representation, the high-level representation comprising a plurality of instructions of an instruction set, the plurality of instructions defining an architecture of the neural network including a node definition, specifying an internal implementation of a node of the neural network including dynamics of a node type, and the instruction set comprising a first instruction corresponding to at least one node of the plurality of nodes, the first instruction comprising a syntax based on natural English language structure and grammar to instantiate the at least one node within the neural network;

means for encoding the high-level representation into a low-level hardware independent format; and means for operating the neural network based on the low-level hardware independent format.

38. The apparatus of claim 37, further comprising:

means for compiling the low-level hardware independent format into machine executable instructions for execution on a specific hardware platform, and means for executing the machine executable instructions to operate the neural network on the specific hardware platform.

39. The apparatus of claim 38, wherein the hardware dependent machine executable instructions are central processing unit (CPU) instructions, graphics processing unit (GPU) instructions, or field programmable gate array (FPGA) instructions.

\* \* \* \* \*